(12) United States Patent
Ishikawa et al.

(10) Patent No.: US 11,068,154 B2
(45) Date of Patent: Jul. 20, 2021

(54) WEARABLE APPARATUS AND CONTROL APPARATUS

(71) Applicant: SONY CORPORATION, Tokyo (JP)

(72) Inventors: Hirotaka Ishikawa, Kanagawa (JP); Chisako Kajihara, Tokyo (JP); Satoshi Akagawa, Tokyo (JP); Tsubasa Tsukahara, Tokyo (JP); Takeshi Iwatsu, Kanagawa (JP); Yasuki Kanema, Tokyo (JP)

(73) Assignee: SONY CORPORATION, Tokyo (JP)

( * ) Notice: Subject to any disclaimer, the term of this patent is extended or adjusted under 35 U.S.C. 154(b) by 217 days.

(21) Appl. No.: 15/118,617

(22) PCT Filed: Dec. 25, 2014

(86) PCT No.: PCT/JP2014/006447
§ 371 (c)(1),
(2) Date: Aug. 16, 2016

(87) PCT Pub. No.: WO2015/125200
PCT Pub. Date: Aug. 27, 2015

(65) Prior Publication Data
US 2017/0052692 A1 Feb. 23, 2017

(30) Foreign Application Priority Data
Feb. 21, 2014 (JP) .............................. JP2014-032357

(51) Int. Cl.
*G06F 3/0482* (2013.01)
*G06F 1/16* (2006.01)
(Continued)

(52) U.S. Cl.
CPC ......... *G06F 3/04883* (2013.01); *G02B 27/00* (2013.01); *G06F 1/163* (2013.01);
(Continued)

(58) Field of Classification Search
CPC .... G06F 3/0482; G06F 3/0485; G06F 3/0488; G06F 3/04883; G06F 1/163; G06F 1/167;
(Continued)

(56) References Cited

U.S. PATENT DOCUMENTS 8,019,316 B2 * 9/2011 Huston ............. H04W 52/0229
455/343.1
2003/0064757 A1 * 4/2003 Yamadera ............. G06F 3/0482
455/566
(Continued)

FOREIGN PATENT DOCUMENTS

JP 2009-251154 A 10/2009
JP 2011-108019 A 6/2011
(Continued)

OTHER PUBLICATIONS

NXP begins shipping NFC tags that can wake up a host device. Article [online], NFCW, Aug. 14, 2013 [retrieved on Mar. 10, 2021], Retrieved from https://www.nfcw.com/2013/08/14/325492/nxp-begins-shipping-nfc-tags-that-can-wake-up-a-host-device/ (Year: 2013).*
(Continued)

*Primary Examiner* — David S Posigian
(74) *Attorney, Agent, or Firm* — Chip Law Group

(57) ABSTRACT

A wearable apparatus includes a display unit and a display control unit. The display unit is configured to switch and display a plurality of images classified for each layer. The display control unit is configured to selectively execute a first display control mode and a second display control mode. The first display control mode causes the display unit to display, on the basis of an operation event, the second image from a third image not relating to the first image via the first image. The second display control mode enables the display unit to display the second image from the third
(Continued)

image without the first image when a control signal for prompting access to the second image is received.

12 Claims, 26 Drawing Sheets

(51) Int. Cl.
| | |
|---|---|
| *H04W 4/80* | (2018.01) |
| *H04W 12/50* | (2021.01) |
| *G06F 3/0488* | (2013.01) |
| *G06F 3/0485* | (2013.01) |
| *G06F 3/0354* | (2013.01) |
| *G02B 27/00* | (2006.01) |
| *G06F 3/0346* | (2013.01) |
| *G06F 3/16* | (2006.01) |

(52) U.S. Cl.
CPC ........ *G06F 3/0346* (2013.01); *G06F 3/03547* (2013.01); *G06F 3/0482* (2013.01); *G06F 3/0485* (2013.01); *G06F 3/0488* (2013.01); *G06F 3/167* (2013.01); *H04W 4/80* (2018.02); *H04W 12/50* (2021.01)

(58) Field of Classification Search
CPC ... G06F 3/0346; G06F 3/03547; G02B 27/00; G02B 27/017–0176; G02B 2027/0174–0178; H04W 4/80; H04W 12/50; H04W 12/55; G06T 19/006; A61B 5/681
See application file for complete search history.

(56) References Cited

U.S. PATENT DOCUMENTS

| | | | | |
|---|---|---|---|---|
| 2004/0196265 | A1* | 10/2004 | Nohr | G06F 1/1626 345/169 |
| 2007/0237491 | A1* | 10/2007 | Kraft | G02B 27/017 386/230 |
| 2007/0270179 | A1* | 11/2007 | Lee | H04M 1/236 455/550.1 |
| 2010/0180229 | A1* | 7/2010 | Lee | G06F 3/0238 715/808 |
| 2012/0030043 | A1* | 2/2012 | Ross | G06Q 30/06 705/16 |
| 2012/0242698 | A1* | 9/2012 | Haddick | G06F 3/011 345/633 |
| 2012/0266068 | A1* | 10/2012 | Ryman | G06F 3/0485 715/719 |
| 2012/0317484 | A1* | 12/2012 | Gomez | G02B 27/017 715/716 |
| 2013/0111410 | A1* | 5/2013 | Okada | G06F 3/0482 715/841 |
| 2013/0254705 | A1* | 9/2013 | Mooring | G06F 3/0488 715/784 |
| 2013/0263054 | A1* | 10/2013 | Lee | G06F 3/04817 715/835 |
| 2014/0092264 | A1* | 4/2014 | Kim | H04N 5/23241 348/207.11 |
| 2014/0098102 | A1* | 4/2014 | Raffle | G06F 3/0482 345/440 |
| 2014/0154987 | A1* | 6/2014 | Lee | H04W 76/11 455/41.2 |
| 2015/0026647 | A1* | 1/2015 | Park | G06F 3/0488 715/863 |
| 2015/0185837 | A1* | 7/2015 | Whitney | G06F 3/017 345/156 |
| 2015/0193098 | A1* | 7/2015 | Kauffmann | G06F 3/0484 715/771 |

FOREIGN PATENT DOCUMENTS

| | | |
|---|---|---|
| JP | 2012-60200 A | 3/2012 |
| JP | 2012-226393 A | 11/2012 |
| JP | 2013-70346 A | 4/2013 |
| JP | 2013-137751 A | 7/2013 |

OTHER PUBLICATIONS

International Search report on patentability received for PCT Application No. PCT/JP2014/006447, dated Mar. 10, 2015, 5 pages of report including 2 pages of English translation.
Written Opinion received for PCT Application No. PCT/JP2014/006447, dated Mar. 10, 2015, 10 pages of report including 6 pages of English translation.
International preliminary report on patentability for PCT Application No. PCT/JP2014/006447, dated Aug. 23, 2016, 5 pages.

\* cited by examiner

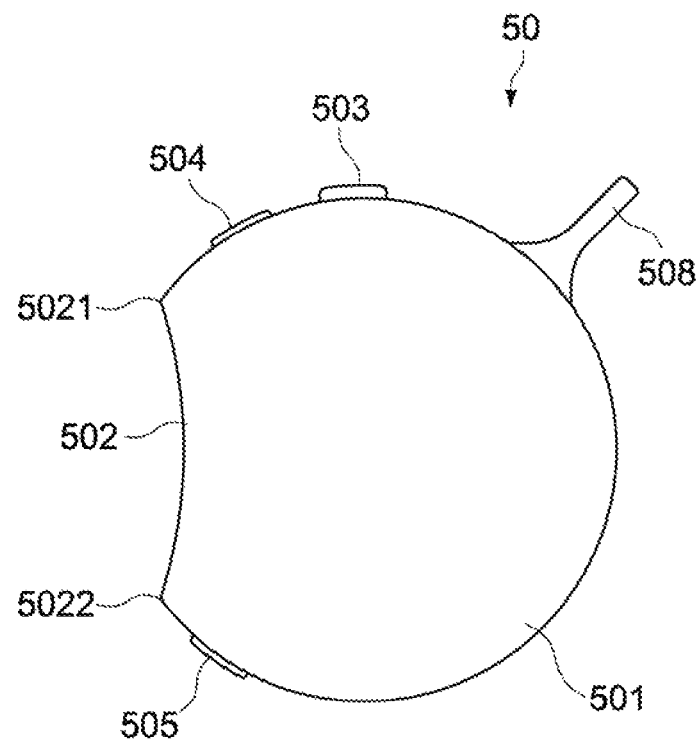
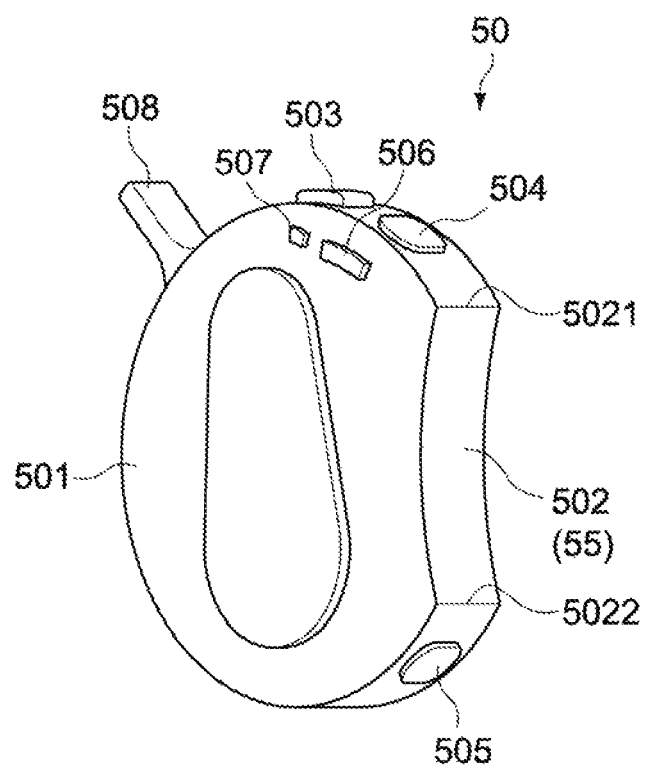
FIG.3

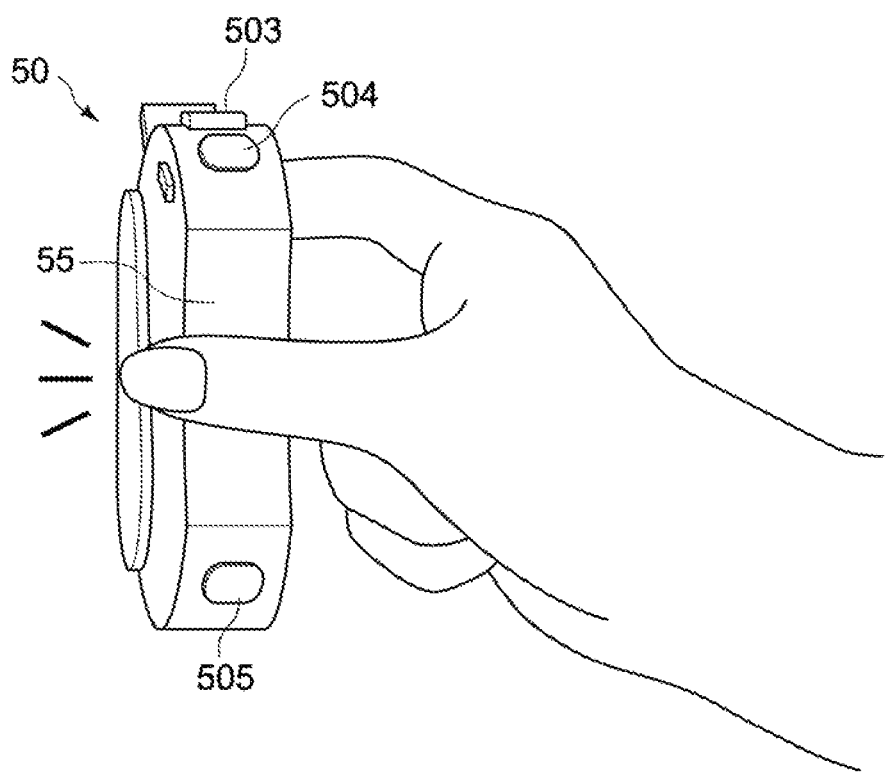
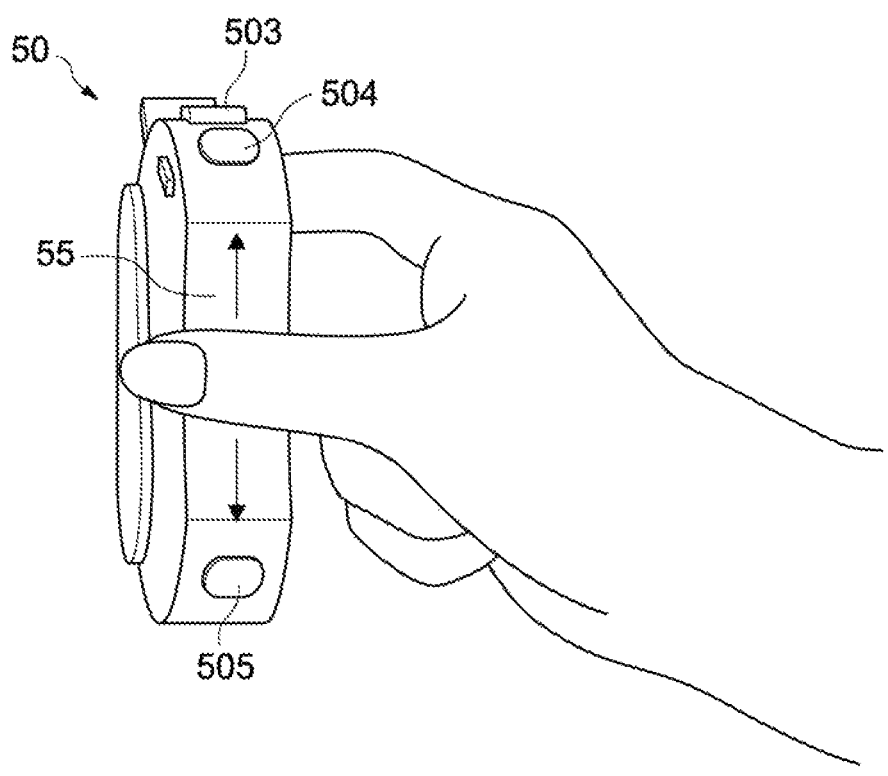
FIG.4

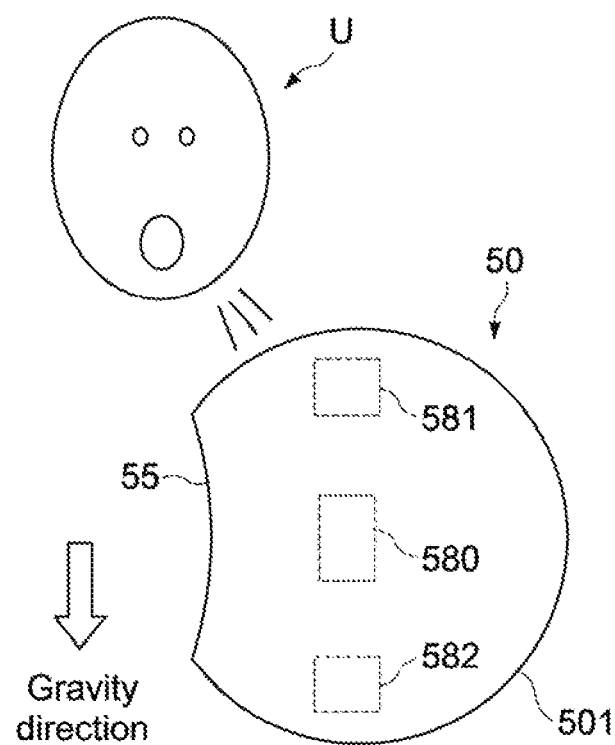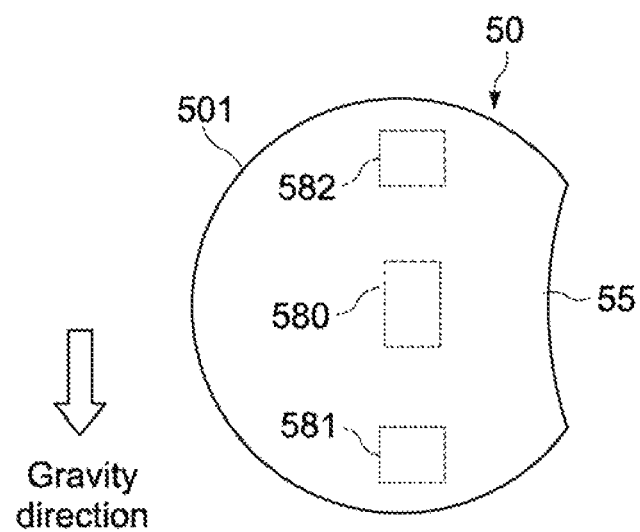
FIG.8

WEARABLE APPARATUS AND CONTROL APPARATUS

CROSS REFERENCE TO RELATED APPLICATIONS

This application is a U.S. National Phase of International Patent Application No. PCT/JP2014/006447 filed on Dec. 25, 2014, which claims priority benefit of Japanese Patent Application No. JP 2014-032357 filed in the Japan Patent Office on Feb. 21, 2014. Each of the above-referenced applications is hereby incorporated herein by reference in its entirety.

TECHNICAL FIELD

The present technology relates to a wearable apparatus including a display unit capable of displaying an image and to a control apparatus.

BACKGROUND ART

An electronic apparatus capable of displaying a plurality of images on a display unit in order has been known. For example, Patent Document 1 describes an electronic apparatus configured to display, when detecting a user's predetermined operation with respect to a representative image of a predetermined group, the representative image and a plurality of thumbnail images belonging to this group.
Patent Document 1: Japanese Patent Application Laid-open No. 2011-210138

SUMMARY OF INVENTION

Problem to be Solved by the Invention

However, there is a problem of poor operability because, for displaying a particular image, it is necessary to first access a representative image of a group belonging to this image.

In view of the above-mentioned circumstances, it is an object of the present technology to provide a wearable apparatus capable of achieving an improvement in the operability and a control apparatus.

Means for Solving the Problem

A wearable apparatus according to an embodiment of the present technology includes a display unit, an operation unit, a reception unit, and a display control unit.

The display unit is configured to switch and display a plurality of images classified for each layer.

The operation unit includes a first operation section. The first operation section is configured to receive input of an operation event that causes the display unit to display, from a first image belonging to a first layer, a second image relating to the first image and belonging to a second layer at a level lower than the first image.

The reception unit is configured to be capable of receiving a control signal for prompting access to the second image.

The display control unit is configured to selectively execute a first display control mode and a second display control mode. The first display control mode causes the display unit to display, on the basis of the operation event, the second image from a third image not relating to the first image via the first image. The second display control mode enables the display unit to display the second image from the third image without the first image when the control signal is received.

In accordance with the wearable apparatus, it is possible to display a particular image easily by a simple operation, and hence to achieve an improvement in the operability.

The operation unit may further include a second operation section that generates the control signal according to an input operation. The display control unit is configured to cause the display unit to display an image belonging to the predetermined layer when the input operation on the second operation section is performed.

The wearable apparatus may further include an imaging unit operable by the second operation section. The display control unit is configured to cause the display unit to display an operation screen of the imaging unit on the basis of the input operation on the second operation section.

The reception unit may be configured to be capable of receiving the control signal from an external apparatus. The display control unit is configured to cause the display unit to display a predetermined notification image when the control signal is received.

The display control unit may be configured to cause the display unit to display a screen relating to the notification image when the input of the predetermined operation event is received with the predetermined notification image being displayed.

A control apparatus according to an embodiment of the present technology is a control apparatus for controlling a wearable apparatus including a display unit configured to switch and display a plurality of images classified for each layer, the control apparatus including an operation unit, a reception unit, and a display control unit.

The operation unit includes a first operation section. The first operation section is configured to receive input of an operation event that causes the display unit to display, from a first image belonging to a first layer, a second image relating to the first image and belonging to a second layer at a level lower than the first image.

The reception unit is configured to be capable of receiving a control signal for prompting access to the second image.

The display control unit is configured to selectively execute a first display control mode and a second display control mode. The first display control mode enables the display unit to display, on the basis of the operation event, the second image from a third image not relating to the first image via the first image. The second display control mode enables the display unit to display the second image from the third image without the first image when the control signal is received.

In the control apparatus, the operation unit may further include a second operation section that generates the control signal according to an input operation. The display control unit is configured to cause the display unit to display an image belonging to the predetermined layer when the input operation on the second operation section is performed.

The operation unit may further include a casing including a cutout in a part of a side peripheral surface. The first operation section is constituted of a capacitive sensor disposed in the cutout, and the second operation section includes a plurality of input keys arranged in the side peripheral surface of the casing.

Effects of the Invention

As described above, in accordance with the present technology, it is possible to achieve an improvement in the operability.

It should be noted that the effect described here is not necessarily limitative and may be any effect described in the present disclosure.

BRIEF DESCRIPTION OF DRAWINGS

FIG. 3 Side and perspective views showing an outer appearance of a control box in the system.

FIG. 4 A diagram explaining an operation input example of the control box.

FIG. 8 A schematic view explaining functions of the control box.

MODE(S) FOR CARRYING OUT THE INVENTION

Hereinafter, embodiments according to the present technology will be described with reference to the drawings.
[Overall Configuration of Information Processing System Using Wearable Apparatus]

Figure 1:
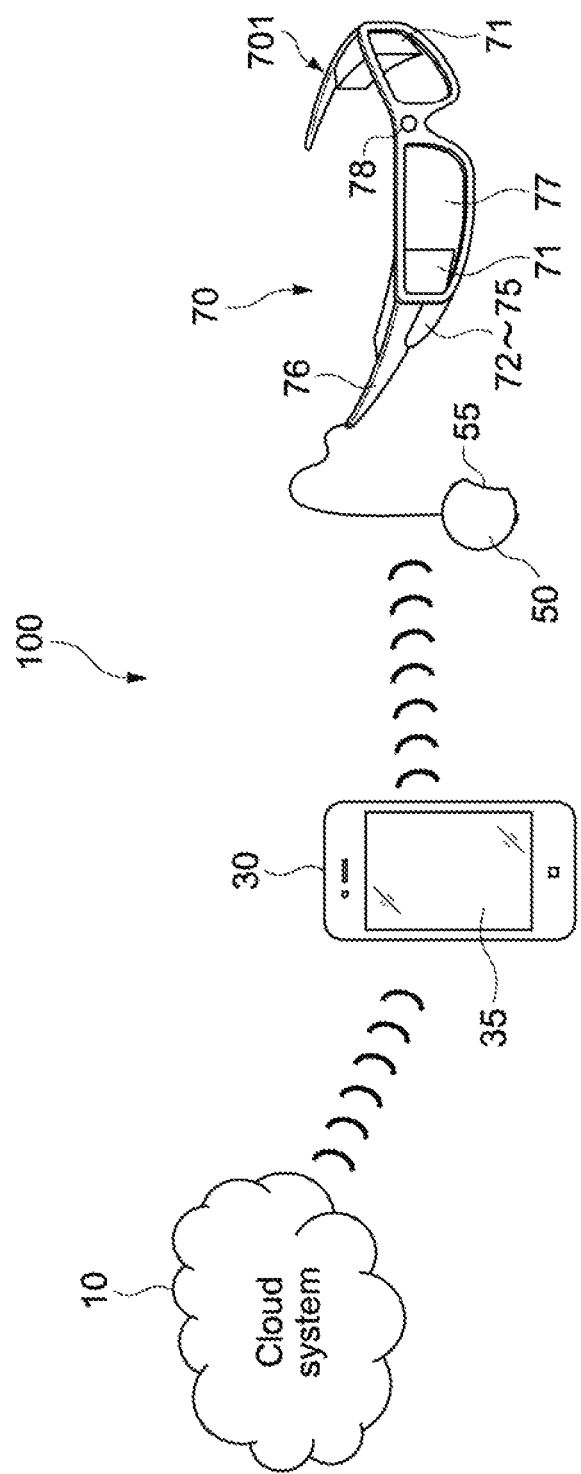
FIG. 1 A diagram showing a configuration of an information processing system according to the present technology.

FIG. 1 shows a configuration of an information processing system according to the present technology.

This system 100 mainly includes a portable terminal 30, a wearable apparatus (wearable display) 70 as an electronic apparatus, and a control box 50 that functions as a control apparatus that controls this wearable apparatus 70.

The portable terminal 30 functions as an information processing apparatus and is typically a mobile phone such as a smartphone. The portable terminal 30 may be a tablet device or another PC (Personal Computer).

The wearable apparatus 70 is, as shown in the figure, of a head-mounted type. However, it is not limited thereto and may be, for example, of a wrist band type or a neck band type.

The portable terminal 30 is configured to be connected to a cloud system 10. The cloud system 10 includes a server computer and the like connected to, for example, a telecommunications network such as the Internet.

Typically, the control box 50 is wiredly connected to the wearable apparatus 70. A user can operate the wearable apparatus 70 by putting the wearable apparatus 70 on his/her head and operating the control box 50 with his/her fingers.
[Configurations of Respective Devices]

Figure 2:
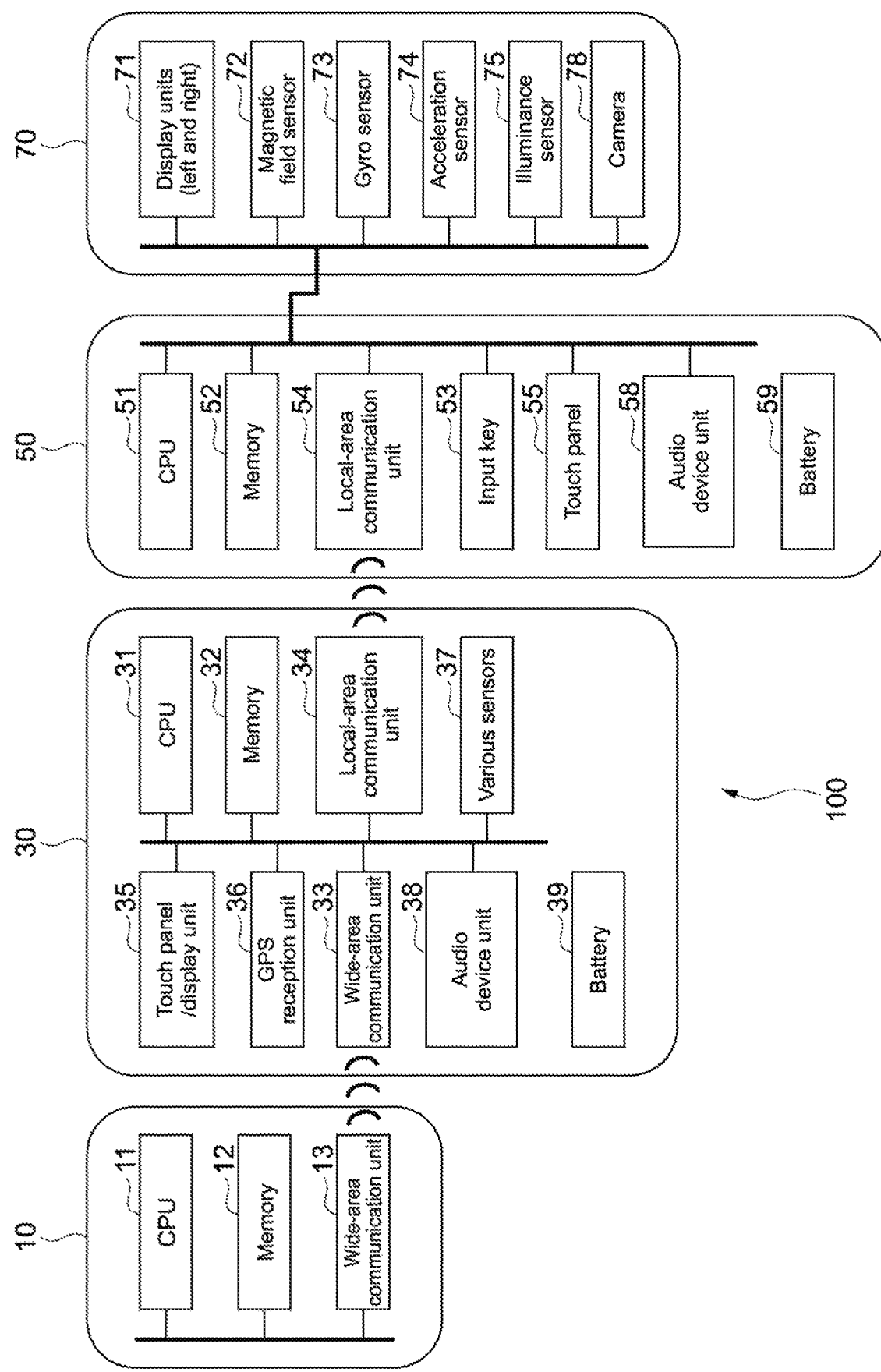
FIG. 2 A block diagram showing configurations of respective devices of the system.

FIG. 2 is a block diagram showing configurations of respective devices of this system 100.
(Cloud System)

For example, a server computer in the cloud system 10 includes a CPU 11, a memory 12, and a wide-area communication unit 13 configured to be communicable with the portable terminal 30.
(Portable Terminal)

The portable terminal 30 (e.g., smartphone) mainly includes a CPU (Central Processing Unit) 31, a memory 32, a touch panel/display unit 35, a wide-area communication unit 33, and a local-area communication unit 34. In addition to them, the portable terminal 30 further includes various sensors 37 including a motion sensor, a camera, and the like, a GPS (Global Positioning System) reception unit 36, an audio device unit 38, a battery 39, and the like. At least the portable terminal 30 (or the portable terminal 30 and the cloud system 10) functions as an external apparatus of the wearable apparatus 70.

The wide-area communication unit 33 is configured to be communicable by a communication system, for example, 3G (Third Generation) or LTE (Long Term Evolution). The local-area communication unit 34 is configured to be communicable by, for example, a wireless LAN (Local Area Network) communication system such as WiFi and/or a short-distance wireless communication system such as Bluetooth (registered trademark) and infrared communication. The local-area communication unit 34 functions as a "reception unit" and a "transmission unit" from/to the control box 50.

In addition to the local-area communication unit 34, the portable terminal 30 may include, for example, an individual identification device using a so-called short-distance wireless communication system (NFC: Near Field Communication) such as an RFID (Radio Frequency IDentification).

The audio device unit 38 includes a microphone and a speaker.

(Wearable Apparatus)

The wearable apparatus 70 includes a mounting unit 701 configured to be mountable on the user's head. The mounting unit 701 includes a display unit 71, various sensors 72 to 75, a camera 78, and the like.

The display unit 71 is, as shown in FIG. 1, a small projector disposed at each of the left and right of a frame 76 of the head-mounted type wearable apparatus 70, for example. In the head-mounted type wearable apparatus 70, identical image light or image light having a disparity, which is emitted by each projector, is guided by a light guide plate 77 and emitted from a predetermined region of the light guide plate 77 toward a user's eyeball.

Note that the display unit 71 may be disposed at only one of the left and right of the wearable apparatus 70. The wearable apparatus 70 is not limited to the projector type and may include the display unit 71 of a type directly emitting image light to the eyeball.

Examples of the various sensors of the wearable apparatus 70 can include a magnetic field sensor 72, a gyro sensor 73, an acceleration sensor 74, and an illuminance sensor 75. The wearable apparatus 70 may include a sensor or the like that detects a field-of-view direction (azimuth or elevation and depression angles).

The gyro sensor 73 (angular velocity sensor) and the acceleration sensor 74 are configured as motion sensors that detect motions in a space of the mounting unit 701.

The camera 78 constitutes an imaging unit capable of capturing a still or moving image. The camera 78 is mounted on the mounting unit 701. In this embodiment, the camera 78 is disposed between the left and right display units 71 (FIG. 1). Note that the mounting position of the camera 78 is not limited to the above example.

The camera 78 is capable of capturing still and moving images. In addition to a normal imaging mode based on a user's operation, the camera 78 is configured to be capable of being driven on an interval imaging mode. On the interval imaging mode, still images are automatically captured at every predetermined time.

(Control Box)

The control box 50 includes a CPU 51, a memory 52 (storage unit), a local-area communication unit 54, an input key 53, a touch panel 55, an audio device unit 58, a battery 59, and the like.

The control box 50 may be configured as an accessory device of the wearable apparatus 70 (e.g., part of wearable apparatus 70) or may be configured as a controller independent of the wearable apparatus 70. The control box 50 functions as an "an operation unit" for switching the display of an image to be displayed on the display unit 71 of the wearable apparatus 70.

The CPU 51 generally controls the respective units of the control box 50 and the wearable apparatus 70. The control box 50 may include, instead of the CPU 51, a PLD (Programmable Logic Device) such as an FPGA (Field Programmable Gate Array).

The local-area communication unit 54 is configured to be communicable with the local-area communication unit 34 of the portable terminal 30 by the above-mentioned communication system. The local-area communication unit 54 functions as a "reception unit" or a "transmission unit" from/to the portable terminal 30.

The input key 53 and the touch panel 55 constitute an "operation unit" for the wearable apparatus 70.

The input key 53 are one or more physical keys that are arranged in the control box 50 and operated by the user. The input key 53 includes, for example, a power key, a back key, an on/off key of the display unit 71, and a shutter button of the camera 78. The input key 53 is configured as a "second operation section" for the wearable apparatus 70.

The touch panel 55 is an operation device disposed on a surface of the control box 50 (see FIG. 1) and operated by the user. The touch panel 55 is constituted of a capacitive sensor. The touch panel 55 is configured as a "first operation section" for the wearable apparatus 70.

The audio device unit 58 includes a microphone and a speaker.

The control box 50 may include, in addition to the local-area communication unit 54, for example, a communication device using the short-distance wireless communication system such as the above-mentioned RFID. With this, the user can start predetermined application software of the portable terminal 30 and move the portable terminal 30 closer to the control box 50, to thereby substantially automatically pair these devices.

Further, for example, by the user moving the portable terminal 30 closer to the control box 50, the portable terminal 30 may substantially automatically download application software for pairing them from a cloud such that it can be installed.

As a matter of course, the control box 50 is capable of, even without such a device for short-distance wireless communication, performing pairing with the portable terminal 30 by the use of the local-area communication unit 54.

FIG. 3 is a diagram showing a configuration example of the control box 50. The upper section of FIG. 3 is a side view as viewed from one side and the lower section of FIG. 3 is a perspective view as viewed from another side.

The control box 50 includes a disk-like casing 501 having a predetermined thickness. A cutout 502 is formed in a part of a peripheral portion of the casing 501. The size of the casing 501 is not particularly limited and is typically set to a size that can be held by one hand of the user. The cutout 502 has a circular arc shape protruding toward the center of the casing 501. The circular arc curve surface is configured as the touch panel 55.

Although the cutout is formed as the part of the disk shape in this example, its original shape is not limited to the disk shape as long as the user can recognize the cutout. For example, the cutout may be formed at a corner of a square (or rectangle) or a cutout having a circular arc shape protruding toward the center of the casing may be formed in a side thereof.

A camera button (shutter button) 503, a back button (back key) 504, and a talk button 505 are disposed on the peripheral portion of the casing 501. Although these buttons are arranged in a single column on the peripheral portion near the cutout 502, the positions and arrangement thereof are not limited thereto as a matter of course.

On the other hand, a power button (power key) 506, a display button (on/off key) 507, and the like are disposed on a side surface of the casing 501. Although these buttons are, along the edge of the casing 501, arranged near the camera button 503 and the back button 504, the positions and arrangement thereof are not limited thereto as a matter of course. The power button 506 is constituted of a slide switch with a return spring and configured to be capable of turning on/off the power by repeating a slide operation toward one end. With this, it is possible to prevent the user from erroneously turning on/off the power. Note that the power button 506 may be configured to turn on the power by a slide operation toward one end and turn off the power by a slide operation toward the other end and to provide a hold function on the both ends.

On the peripheral portion of the casing 501, provided is a projecting piece 508 radially extending from the center of the casing 501. The projecting piece 508 is positioned between the index finger and the middle finger when the user holds the casing 501. For example, it is possible to hold the casing 501 also by these fingers sandwiching the projecting piece 508, and hence the operability of the various buttons can be improved.

Further, a clip for attachment to a breast pocket or the like of the clothes of the user may be provided in a surface other than the peripheral portion of the casing 501. With this, portability is improved and it also becomes possible for the user to operate the control box while it is attached to the clothes.

Further, the touch panel 55 is disposed on a peripheral surface of the casing 501 cutout as the cutout 502 and configured to electrostatically detect a tap operation, a swipe operation along a peripheral direction of the cutout 502, and the like. In addition, the touch panel 55 is formed in a formation region of the cutout 502 having the above-mentioned shape, and hence two edges 5021 and 5022 are formed at both ends of the cutout 502. With this, it becomes possible for the user to recognize the position of the touch panel 55 by touching it with the fingers without viewing the touch panel 55, and hence the operability can be further improved.

A general touch panel includes a relatively large non-detection region in the ends of an operation surface. In contrast, the touch panel 55 is configured such that its entire region up to the edges 5021 and 5022 is a detection region due to its small operation surface. Thus, the operability is improved. Note that a region of 90% or more, for example, of the operation surface excluding regions near the edges 5021 and 5022 may be configured as the detection region.

Operation Example Using Touch Panel

FIG. 4 is a diagram explaining an operation example of the control box 50 (input example of operation event).

The upper section of FIG. 4 shows a tap operation (or long-tap operation) with respect to the touch panel 55. The tap operation is input typically by touching a center portion of the touch panel 55 (bottom of cutout 502) for a predetermined time or less. A determination region for the tap operation may be the entire surface of the touch panel 55 or may be a partial region (e.g., region excluding regions near edges 5021 and 5022, for example, region of 80% or less of the operation surface).

For example, tap operations are required for selection of the screen (image) being displayed on the display unit 71, start of the application, and shift from an upper-level layer to a lower-level layer.

The lower section of the figure shows a swipe operation with respect to the touch panel 55. The swipe operation is input typically by touching the touch panel 55 and moving the finger from the center portion of the touch panel 55 toward the edge 5021 or the edge 5022. A determination region for the swipe operation is typically set to the entire surface of the touch panel 55 and is made effective when a distance from a first touch position to a release position is equal to or larger than a predetermined distance.

The swipe operation is used to switch the image to be displayed on the display unit 71, for example, and a swipe direction corresponds to a screen switching direction. Further, by continuing the touch operation for a predetermined time without releasing after a swipe, the screen is successively switched (scroll operation). At this time, a swipe speed is variable according to a swipe distance. The screen switching direction is not particularly limited. The screen switching direction is set based on an arrangement direction of images and typically set to left- and right-hand directions or upper and lower directions.

Note that, for performing a scroll operation on the same screen, the user touches the touch panel 55 for a predetermined time and then performs a swipe operation without releasing it. This operation is used to read character information or a message displayed in the screen.

Operation Example Using Input Key

The camera button 503 is used for capturing an image by the use of the camera 78 (e.g., shutter operation, recording start/end operations). Under a predetermined condition, when an input operation is made thereon, transition to a camera screen may be performed.

The back button 504 is used for returning the screen (image) being displayed in the display unit 71 to that in an upper-level layer. Further, the back button 504 restores, when long pressed, a home screen (e.g., first displayed screen in uppermost-level layer) as the display screen.

The talk button 505 is used for a voice input screen and configured to activate the built-in audio device unit 58 (in particular, microphone) when an input operation is made thereon.

The power button 506 is operated for powering on or off the wearable apparatus 70. The pairing with the portable terminal 30 may be executed in conjunction with the power-on operation.

The display button 507 is operated for turning on or off the image display of the display unit 71.

[Configuration of Software]

Figure 5:
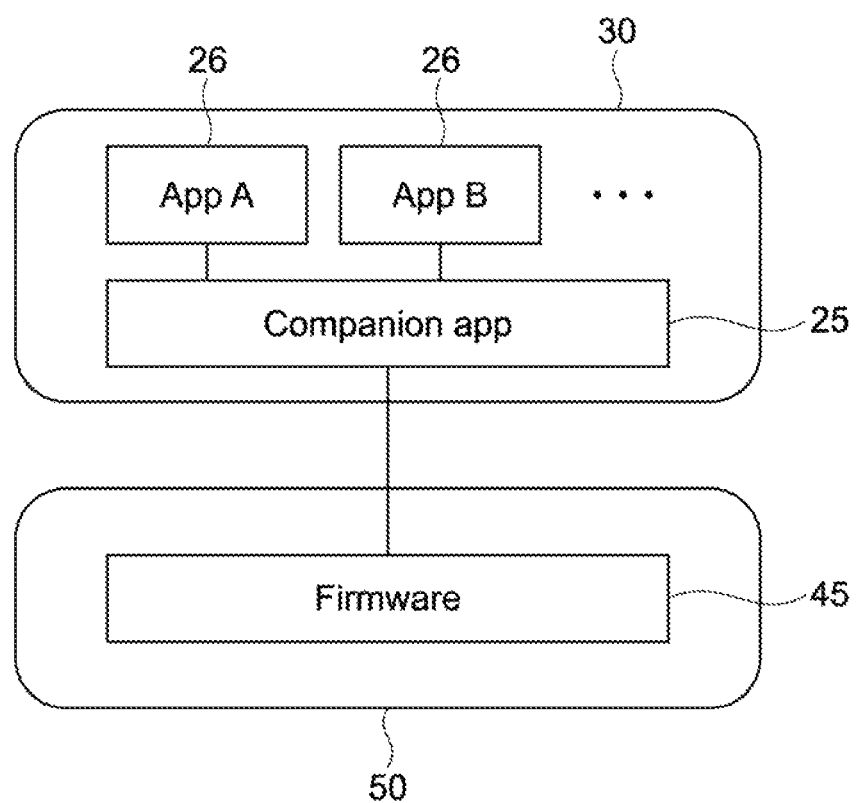
FIG. 5 A diagram showing a configuration of software installed into a portable terminal and the control box in the system.

FIG. 5 shows a configuration of software installed into the portable terminal 30 and the control box 50.

The portable terminal 30 stores general application software (hereinafter, simply referred to as "apps") 26 and a companion app 25 in the memory 32. These apps 25 and 26 are configured to work on an OS (Operating System) installed in the portable terminal 30 by default.

As to the kind of the general apps 26, there are, for example, an SNS (Social Networking Service) app of a mini blog, a communication site, and the like, a voice recognition app, a camera app, media reproduction, news, and weather forecast services.

The companion app 25 functions to convert default data and user data on those apps 26 into data in a format suitable for display on the display unit 71 of the wearable apparatus 70. By the portable terminal 30 downloading, for example, the companion app 25 from the cloud system 10, the companion app 25 is installed into the portable terminal 30.

The control box 50 includes, in the memory 52, firmware 45 that cooperates with the companion app 25 after the pairing. A camera app for operating the camera 78, a setting app on a setting screen to be described later, and the like are installed in the firmware 45 by default.

Figure 6:
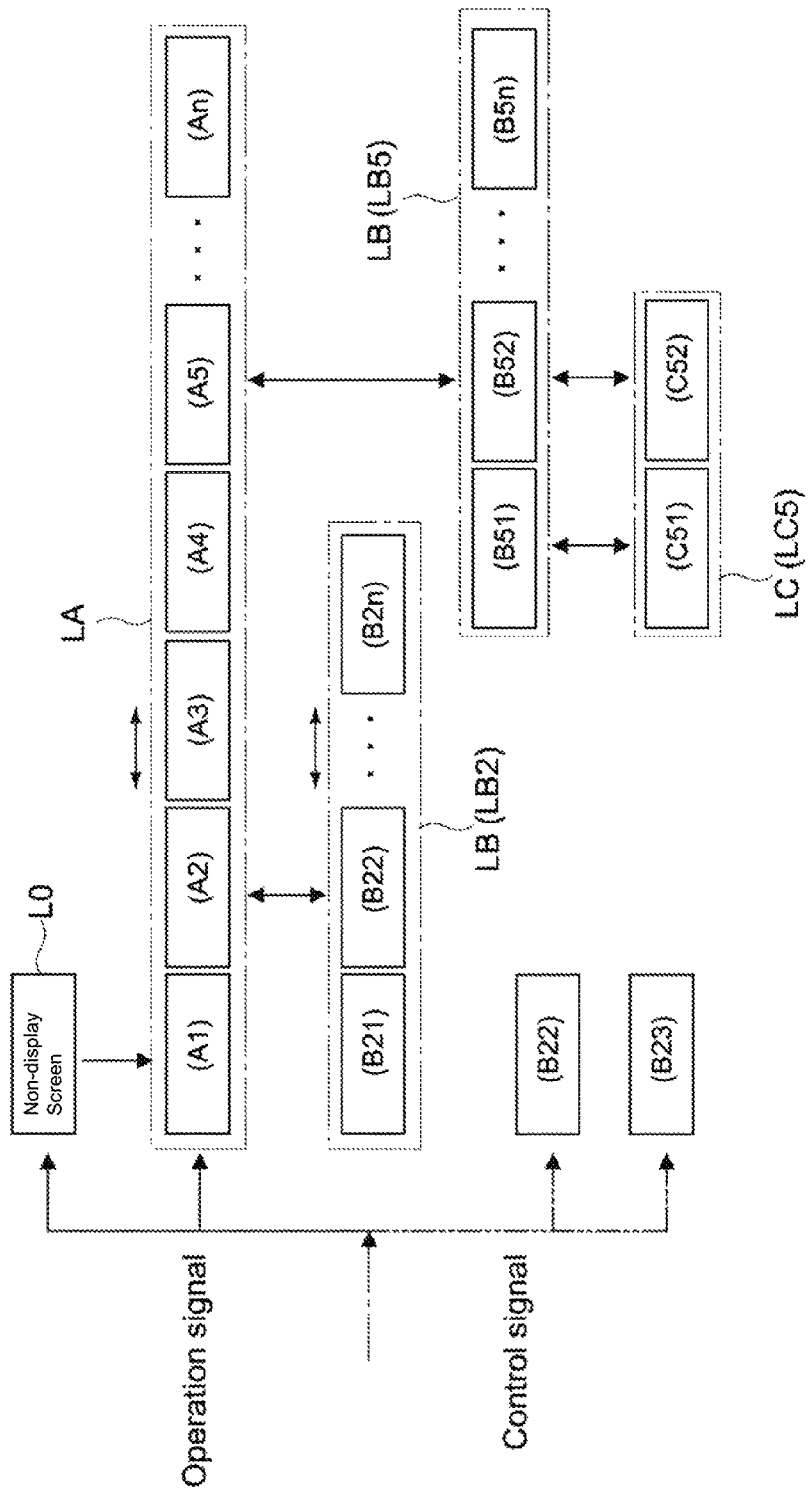
FIG. 6 A diagram explaining a layered structure of screens to be displayed on a wearable apparatus in the system.

Screen Example to be Displayed by Wearable Apparatus and Operation Example of this System Layered Configuration of Screen FIG. 6 is a conceptual diagram showing a layered structure of a screen (image) that can be displayed on the display unit 71.

The screen is classified for each layer. In the example shown in the figure, the screen include a first layer LA, a second layer LB, and a third layer LC. The first layer LA is a uppermost-level layer. The second layer LB is a layer at a level lower than predetermined screens belonging to the first layer LA. The first layer LA corresponds to a collection of UIs (User Interfaces) configuring a selection environment for applications. The second and third layers LB and LC correspond to a collection of UIs configuring an operation environment for applications.

As shown in FIG. 6, when the wearable apparatus 70 is powered, a non-display screen L0 during power off transitions to the first layer LA. N screens (n is a natural number and the same applies hereinafter) of the screens (A1) to (An) belong to the first layer LA. The screen (A1) configures the home screen to be first displayed in the first layer LA. Then, a swipe operation with respect to the control box is configured to sequentially switch the screen from the screen (A1) to the screen (An).

The second layer LB is constituted of a plurality of layers classified for each of the individual screens belonging to the first layer LA. For example, the screen (A2) includes a second layer LB2 and the screen (A5) includes a second layer LB5. The second layer LB2 includes screens (B21) to (B2n) relating to the screen (A2). LB5 includes screens (B51) to (B5n) relating to the screen (A5).

The third layer LC is constituted of a single or a plurality of layers classified for each of predetermined screens belonging to the second layer LB. For example, the screen (B51) and the screen (B52) include a third layer LC5 to which each of the screen (C51) and the screen (C52) belongs.

The number of layers is not particularly limited and only at least two layers are necessary. Further, the number of screens belonging to each layer is not particularly limited and typically a plurality of layers are provided. However, a layer constituted of a single image may be provided as the second layer or a layer at a level lower than the second layer.

The firmware 45 receives output from the input key 53 or the touch panel 55 and switches the screen to be displayed on the display unit 71. Typically, the firmware 45 is configured to execute, on the basis of an operation event (operation signal) input into the touch panel 55, display control to switch the screen to be displayed on the display unit 71 in order of the layers.

Further, the firmware 45 configured to be capable of executing, on the basis of an output from the touch panel 55 under a predetermined condition or an output or the like (hereinafter, referred to as a control signal) from a predetermined button of the input keys 53, display control to jump from the current display screen to a predetermined screen in a predetermined layer. The control signal is output for prompting access to the predetermined screen. For example, the firmware 45 is configured to be capable of causing the display unit 71 to display a predetermined screen of a lower-level layer without a screen of an upper-level layer, by receiving a control signal generated on the basis of an input operation of the predetermined input key 53.

Figure 7:
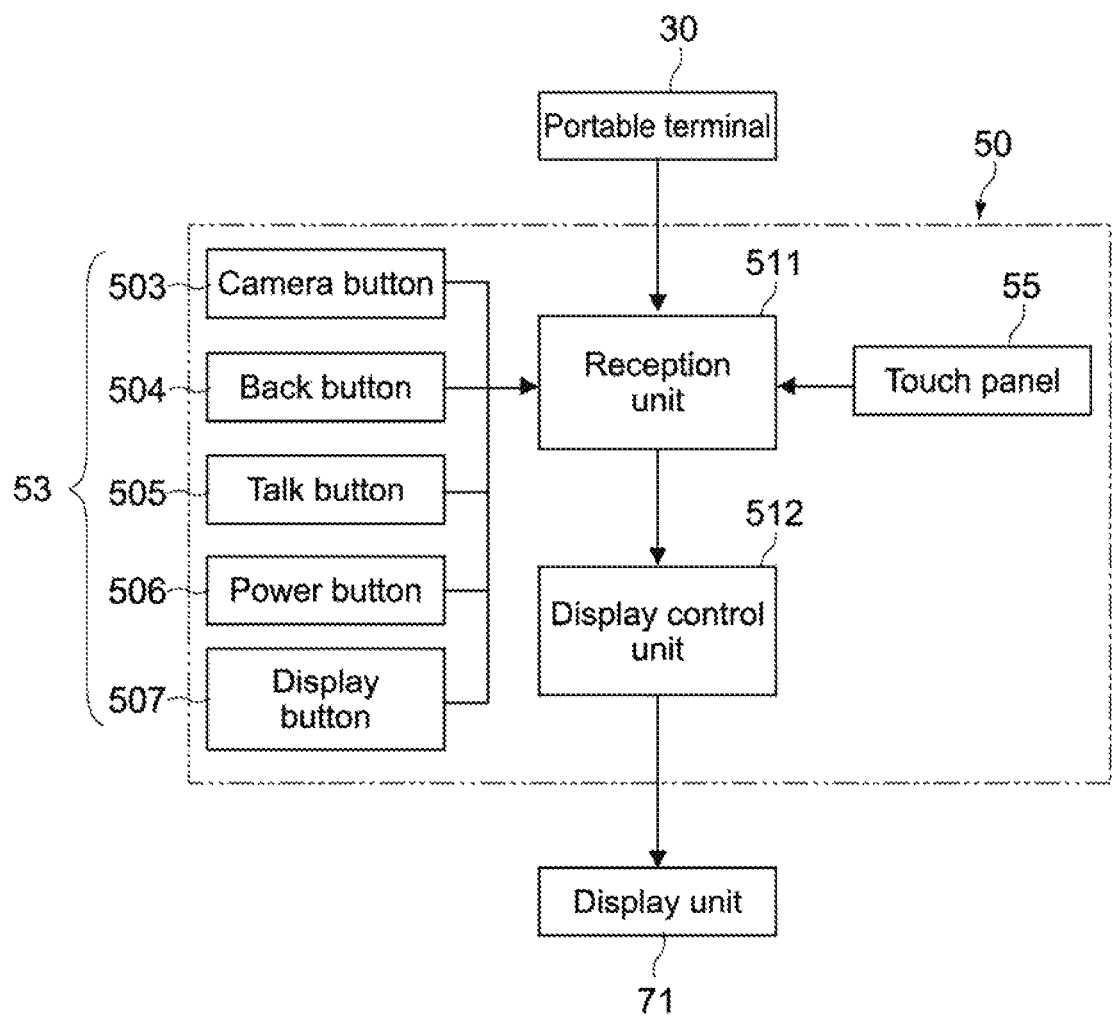
FIG. 7 A functional block diagram of the control box.

FIG. 7 is a functional block diagram of the control box 50.

A reception unit 511 is configured to be capable of receiving various notification signals transmitted from the portable terminal 30, an operation signal output from the input key 53 such as the camera button 503, and an operation signal output from the touch panel 55. A display control unit 512 performs control to switch the image to be displayed on the display unit 71 on the basis of the operation signal received by the reception unit 511.

The control box 50 includes the reception unit 511 and the display control unit 512. The reception unit 511 and the display control unit 512 configure some functions of the firmware 45 or the CPU. Further, the reception unit 511 configures some functions of the local-area communication unit 54 (FIG. 2).

The display control unit 512 includes a first display control mode and a second display control mode.

The first display control mode causes the display unit to display, on the basis of an operation event (operation signal), a second image from a third image not relating to a first image via the first image. On the other hand, the second display control mode enables the display unit to display, when a control signal is received, the second image from the third image without the first image.

Here, the third image refers to an arbitrary image other than a second image group relating to the first image. For example, in FIG. 6, if the second image is the screen (B22) and the third image is the screen (A5), on the first display control mode, the screen transitions in the order of the screen (A5), the screen (A2), and the screen (B22), and, on the second display control mode, the screen transitions in the order of the screen (A5) and the screen (B22). When the third image is the screen (C51), on the first display control mode, the screen transitions in the order of the screen (C51), the screen (B51), the screen (A5), the screen (A2), and the screen (B22), and, on the second display control mode, the screen transitions in the order of the screen (C51) and the screen (B22).

The screens (B22) and (B23) to be displayed when the above-mentioned control signal is received correspond to, for example, a still image-capturing screen or a moving image-capturing screen. For example, the display screen transitions to the still image-capturing operation screen according to a press operation on the camera button 503 or the display screen transitions to the moving image-capturing operation screen according to a long-press operation on the camera button 503.

Other examples of the screens (B22) and (B23) correspond to a voice input screen, a received message-displaying screen, a communication setting screen, and the like.

The voice input screen is displayed on the display unit 71 according to a press operation of the talk button 505. The voice input screen is, for example, a message input screen in an electronic mail or a short character message-posting site. In this case, the user inputs a voice into the built-in microphone (audio device unit 58) of the control box 50. The firmware 45 is configured to be capable of converting the input voice into a text (character) and displaying it on the display unit 71.

In order to improve the accuracy of the voice input function, the control box 50 may include a microphone for cancelling noise. FIG. 8 schematically shows a configuration of this control box.

As shown in FIG. 8, the control box 50 includes therein two microphone 581 and 582 and an acceleration sensor 580. The microphone 581 and 582 have the same configuration and are arranged at vertically symmetrical positions.

A user U inputs a voice from above the control box 50 that he/she is holding, for example. At this time, as shown in the upper and lower sections of FIG. 8, the microphone 581 or 582 positioned on an upper side is configured to function as a main microphone that acquires a voice and the microphone 582 or 581 positioned on a lower side is configured to function as a sub-microphone for cancelling surrounding noise. Switching between the main microphone and the sub-microphone is performed on the basis of a gravity direction detected by the acceleration sensor 580.

With this, it is possible to ensure an appropriate voice input function irrespective of the attitude of the control box 50. Note that the noise cancelling system is not particularly limited and various systems such as active noise control can be employed.

Further, the received message-displaying screen is a browsing screen for a message received by the portable terminal 30. At this time, the reception unit 511 is configured to be capable of receiving a notification signal transmitted from the portable terminal 30 as an external apparatus, as a control signal.

The firmware 45 is configured to be capable of displaying the browsing screen on the display unit 71 when the control signal is received. In this embodiment, when input of a predetermined operation event (e.g., tap operation with respect to touch panel 55) is received with a predetermined notification image being displayed, the firmware 45 is configured to cause the display unit 71 to display a screen relating to the notification image.

In addition, the communication setting screen is a screen to be displayed when a connection defect with the local-area communication unit 54 occurs during use of the wearable apparatus 70. At this time, the reception unit 511 is configured to receive a connection defect signal output from the local-area communication unit 54, as a control signal.

As described above, in accordance with this embodiment, it is possible to display a particular image easily by a simple operation, and hence to achieve an improvement in the operability. Further, it is possible to rapidly display such an image, and hence to also improve operation feeling or convenience for operation.

Screen Example to be Displayed by Wearable Apparatus

Figure 9:
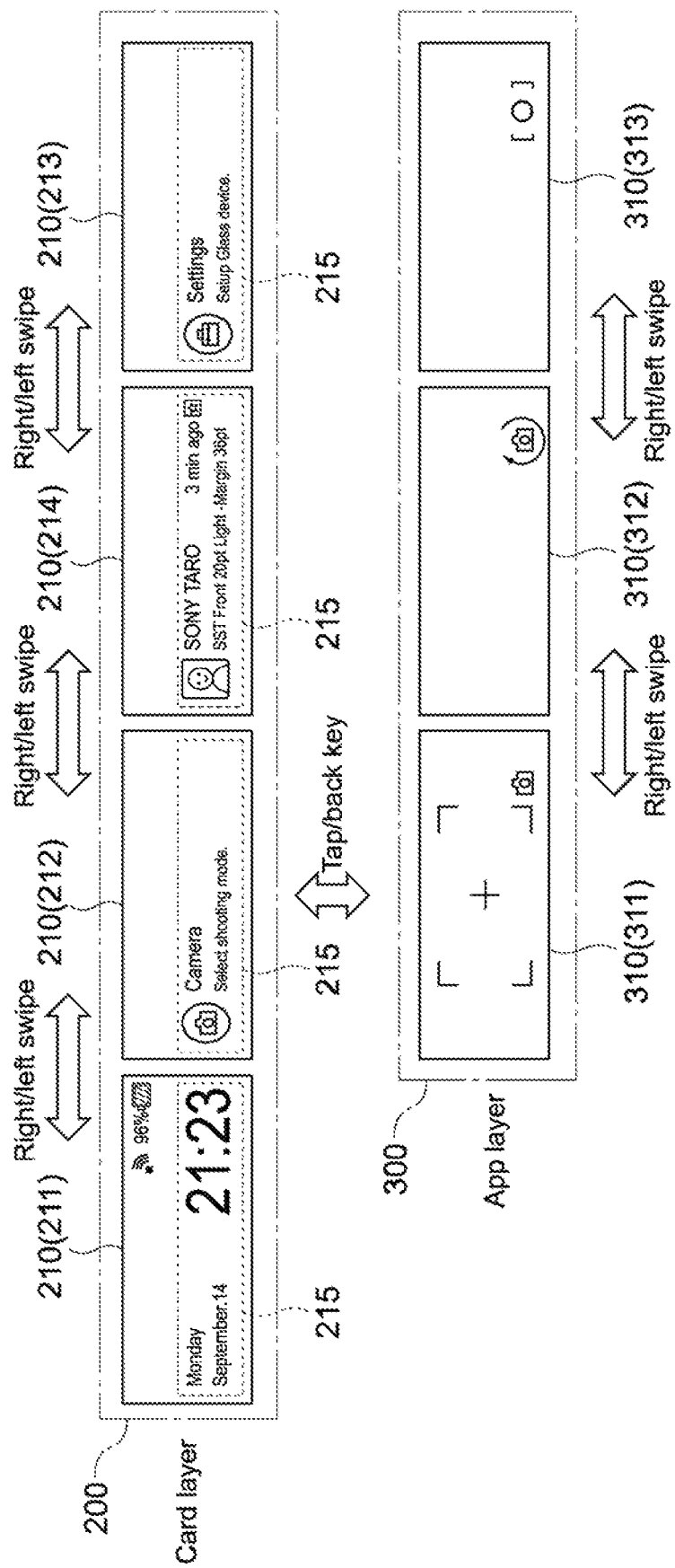
FIG. 9 A diagram explaining switching operations of card screens to be displayed on a display unit.

FIG. 9 shows an example of a screen to be displayed on the display unit 71 of the wearable apparatus 70. Hereinafter, for the sake of description, it is assumed that a subject that performs processing of the portable terminal 30 is the companion app 25 and a subject that performs processing of the control box 50 is the firmware 45.

In the wearable apparatus according to this embodiment, the image to be displayed on the display unit 71 includes a plurality of images (screens) classified for each layer. Typically, by inputting a predetermined event operation into the touch panel 55 of the control box 50, switching of images in the same layer, switching of images between layers, and the like are executed. Such switching of images (screen transition) is executed by the firmware 45. The firmware 45 functions as a "display control unit" for the wearable apparatus 70.

Screen Example of Card Layer

The layer shown in the upper section of FIG. 9 will be referred to as a "card layer." A card layer 200 corresponds to the first layer LA (FIG. 6). For example, the card layer 200 includes various card screens 210 including a home screen 211, a camera screen 212, a setting screen 213, and the like by default. In addition to them, the card layer 200 includes a card screen 214 of the apps 26 (see FIG. 5) registered by the user.

Each of the card screens 210 includes a card image 215 located in a substantially lower-half region, for example, of the entire region of the card screen. The region occupied by a single card screen 210 (and an app screen 310 to be described later) is a display region (Viewport) of the display unit 71. In the following description, the image in the region occupied by the card screen 210 will be referred to as a "card image." Here, the card image (excluding card image of home screen 211) is like an icon or a widget, which is a GUI (Graphical User Interface) for accessing an app. One card image 215 is provided for one card screen 210.

The user can add the card screens 210 (card images 215) by registering them. For example, the user uses the portable terminal 30 to perform a registration operation with respect to an app 26 installed in the portable terminal 30. Then, the companion app 25 generates a card image 215 corresponding to such an app 26.

The card image 215 corresponding to the app refers to an image including a mark or a character that represents the app in the card image 215, for example. Basically, the companion app 25 stores the card images 215 generated by itself in the memory 32 and the firmware 45 also stores a predetermined numbers of card images 215 of them in the memory 52.

The firmware 45 of the control box 50 is configured to display those card screens 210 on the display unit 71 one by one. Regarding the same layer, by the user inputting a left/right swipe operation via the touch panel 55, the firmware 45 causes the display unit 71 to display those card screens 210 in order.

Note that "settings" of the card screens 210, which can be accessed from the setting screen 213, are also one of the app software modules, which is a default built-in app of the control box 50.

Screen Example of Application Layer

The layer shown in the lower section of FIG. 9 will be referred to as an "app layer 300." The app layer 300 corresponds to the second layer LB (FIG. 6) and can be basically accessed via the card layer 200. The app layer 300 includes (app images on) app screens 310 on which apps of the card screens 210 have been started.

The display unit 71 displays those app screens 310 one by one. The user can access the app layer 300 via the card layer 200. For accessing the app layer 300, the user performs a tap operation on the touch panel 55 with a card screen 210 selected in the card layer 200 being displayed on the display unit 71. Then, the firmware 45 causes the display unit 71 to display an app screen 310 corresponding to that card screen 210.

For returning from the app screen 310 to the card screen 210, the user presses the back button 504 provided as the input key 53 (see FIG. 2) of the control box 50.

By performing a swipe operation with respect to the touch panel 55 in the left- and right-hand directions with an arbitrary app screen 310 being displayed in the app layer 300, the user can switch the app screen 310 in the single app. For example, it is possible to switch between a first function of an app and a second function of the app that is different from the first function. The number of functions (number of app images) varies depending on the app.

If the app is a camera app, as shown in FIG. 9, the camera app includes a screen 311 of a still image-capturing mode as the first function, a screen 313 of an interval imaging mode as the second function, and a screen 313 of a moving image-capturing mode as the third function, for example.

Note that the direction of the swipe operation by the finger of the user and a moving direction of an image may be the same or may be opposite. It can be changed by user settings.

(Switching Process of Card Screens in Card Layer)

Typically, the companion app 25 of the portable terminal 30 stores all the stored card images 215 in the memory 32. On the other hand, the firmware 45 stores a predetermined number of card images 215 of them (e.g., predetermined number of card images 215 in registration order) in the memory 52 of the control box 50. Then, the firmware 45 extracts a card image 215, which is specified by the user via the touch panel 55, from the memory 52 and displays it on the display unit 71. Further, the firmware 45 requests transmission of a card image 215 from the memory 32 of the portable terminal 30 via the companion app 25 if necessary and receives it and displays it on the display unit 71. Specifically, the firmware 45 and the companion app 25 are operated in the following manner.

Figure 10:
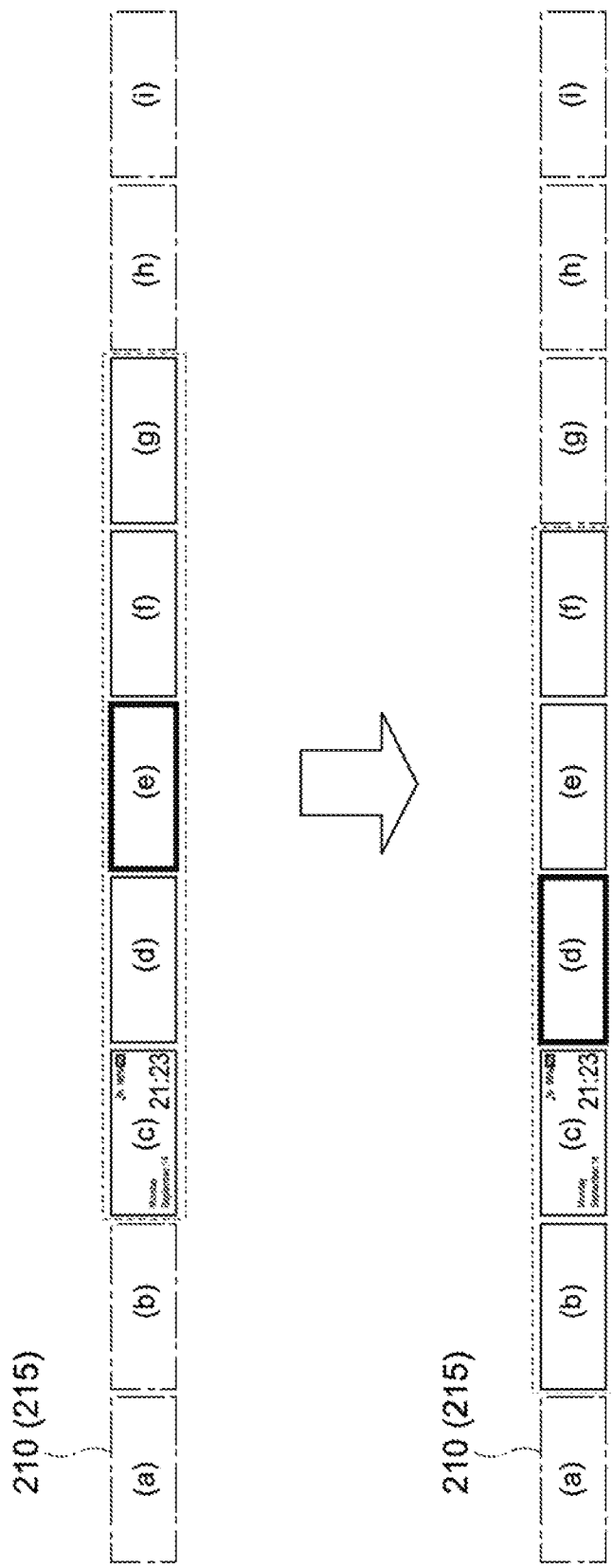
FIG. 10 A diagram explaining a switching operation of card screens to be displayed on the display unit.

FIG. 10 is a diagram for explaining a switching operation of the card screens 210 in the card layer 200. As shown in the upper section of in FIG. 10, for example, it is assumed that the memory 32 of the portable terminal 30 stores nine card images 215(a) to (i). Further, it is assumed that the memory 52 of the control box 50 stores five card images 215(c) to (g) (portion surrounded by broken line) of them. The five card images 215(c) to (g) are continuous card images 215. The card image 215(e) shown with the bold frame is currently displayed on the display unit 71. Note that the card image 215(c) is a card image of the home screen.

It is assumed that, in the state shown in the upper section of FIG. 10, the user inputs a swipe operation to move the card screens 210 to the left. Then, as shown in the lower section of FIG. 10, the firmware 45 switches the currently displayed card image 215(e) to the card image 215(d) and discards the card image 215(g) at the end (right end) which has been stored until then.

When the swipe operation is input, the firmware 45 notifies the portable terminal 30 of input operation information. The companion app 25 extracts the card image 215(b) newly located at the end (left end) from the memory 32 and sends it to the control box 50. The firmware 45 receives it and stores it in the memory 52.

In this manner, the firmware 45 maintains a predetermined number of (five) card images 215 stored in the memory 52.

The above-mentioned processing makes it possible to smoothly switch the card screens 210 while reducing a necessary memory capacity in the control box 50 or reducing the cost by the use of the smaller-capacity memory.

Regarding the card image 215 of the home screen 211 and the card images 215 of the screens of the default apps such as the camera app, the control box 50 does not need to discard them and may still store them. In this case, the control box 50 only needs to store a predetermined number of or fewer card images 215 other than those of the home screen 211 and the default apps in the memory 52.

Transition Examples of Screen to be Displayed by Wearable Apparatus

Hereinafter, representative screen transition examples of the wearable apparatus 70 will be described.

Screen Transition Example 1

Figure 11:
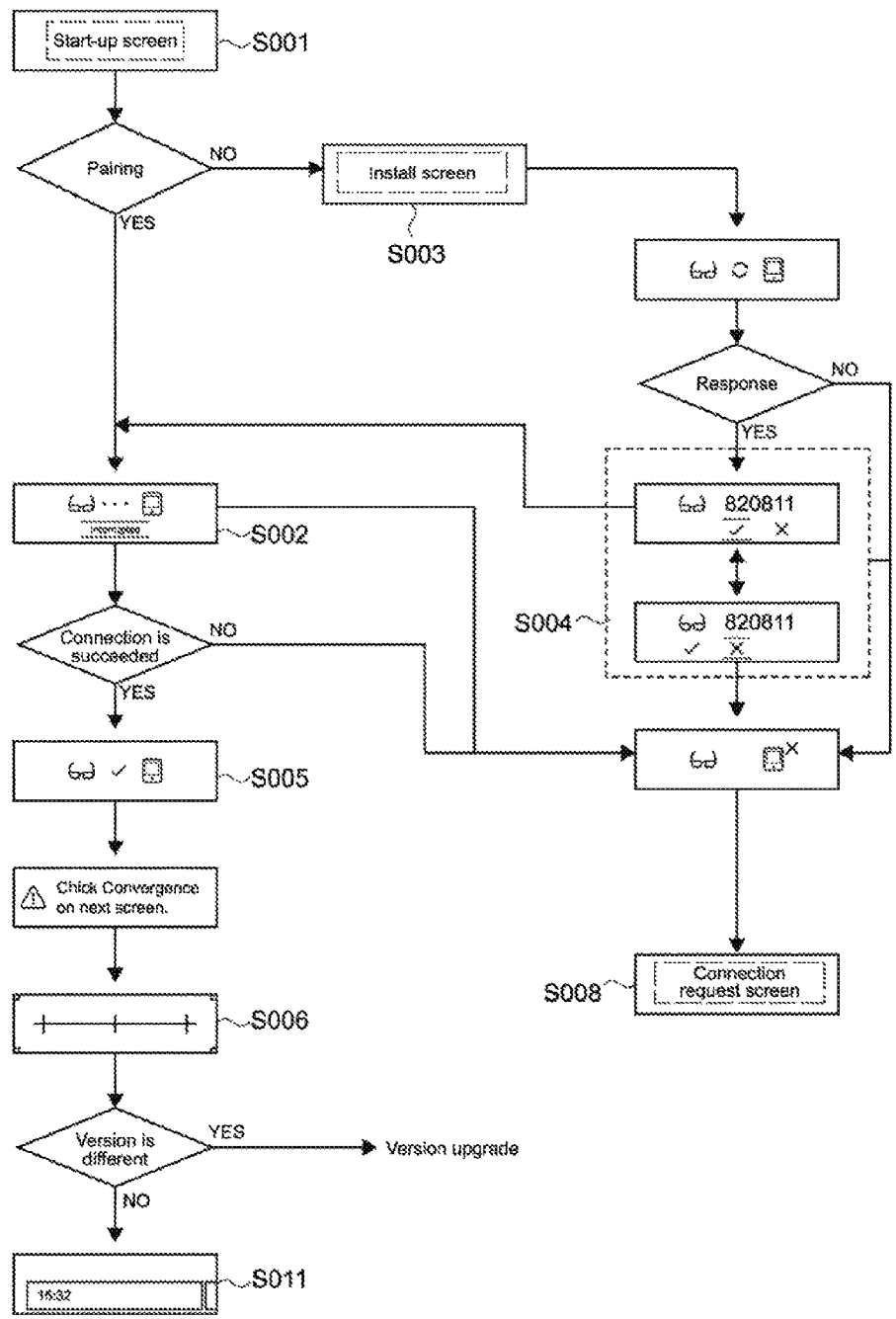
FIG. 11 A diagram showing a transition example of a representative screen to be displayed by the wearable apparatus.

FIG. 11 shows a transition example of a screen to be displayed on the display unit 71 upon starting of the wearable apparatus 70.

When the power is turned on according to an operation on the power button 506, a start-up screen (S001) is displayed. A maker name, a model name, and the like are typically displayed on the start-up screen.

If information on pairing with the portable terminal 30 is present after a predetermined time period has elapsed, a screen (S002) for pairing with the portable terminal 30 is displayed.

On the other hand, if the pairing information is absent, an install screen (S003) for a necessary app is displayed and install is executed through a tap operation with respect to the touch panel 55. If a response from the portable terminal 30 is present after the install is completed, a numerical value comparison authentication screen (S004) is displayed and the screen transitions to the pairing screen (S002) by performing a tap operation on a connection-needing screen.

When the pairing with the portable terminal 30 is established, the screen transitions to a connection-succeeded screen (S005) and a balance control screen (S006) by performing a tap operation according to the screen. After that, version information of the firmware 45 is confirmed and then the screen transitions to a home screen (S011). This home screen corresponds to the home screen 211 (FIG. 9) of the card layer 200.

Note that, for example, if the connection between the wearable apparatus 70 and the portable terminal 30 fails, a predetermined connection request screen (S008) is displayed.

Screen Transition Example 2

Figure 12:
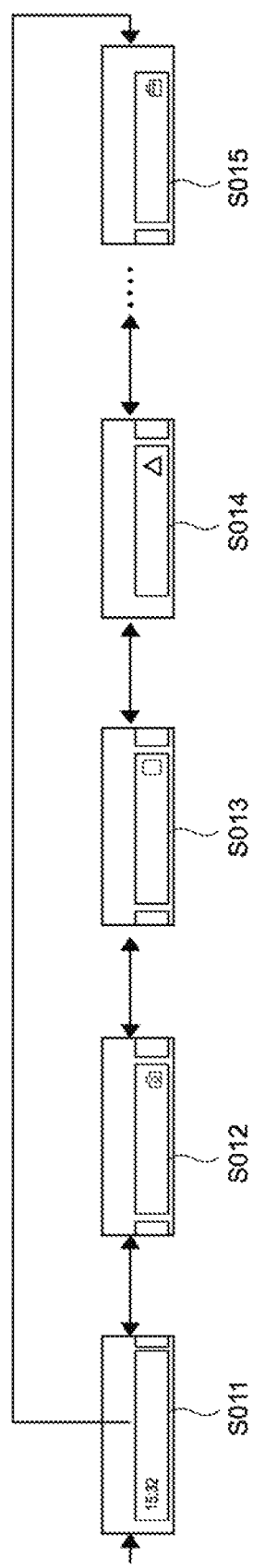
FIG. 12 A diagram showing a transition example of a representative screen to be displayed by the wearable apparatus.

FIG. 12 shows a transition example of screens in the card layer.

According to a forward swipe operation on the touch panel 55, the home screen (S011) transitions to a camera screen (S012), an SNS screen (S013), a communication setting screen (S014), a setting screen (S015), etc. The details are the same as described with reference to FIG. 9, and hence are omitted here.

Screen Transition Example 3

Figure 13:
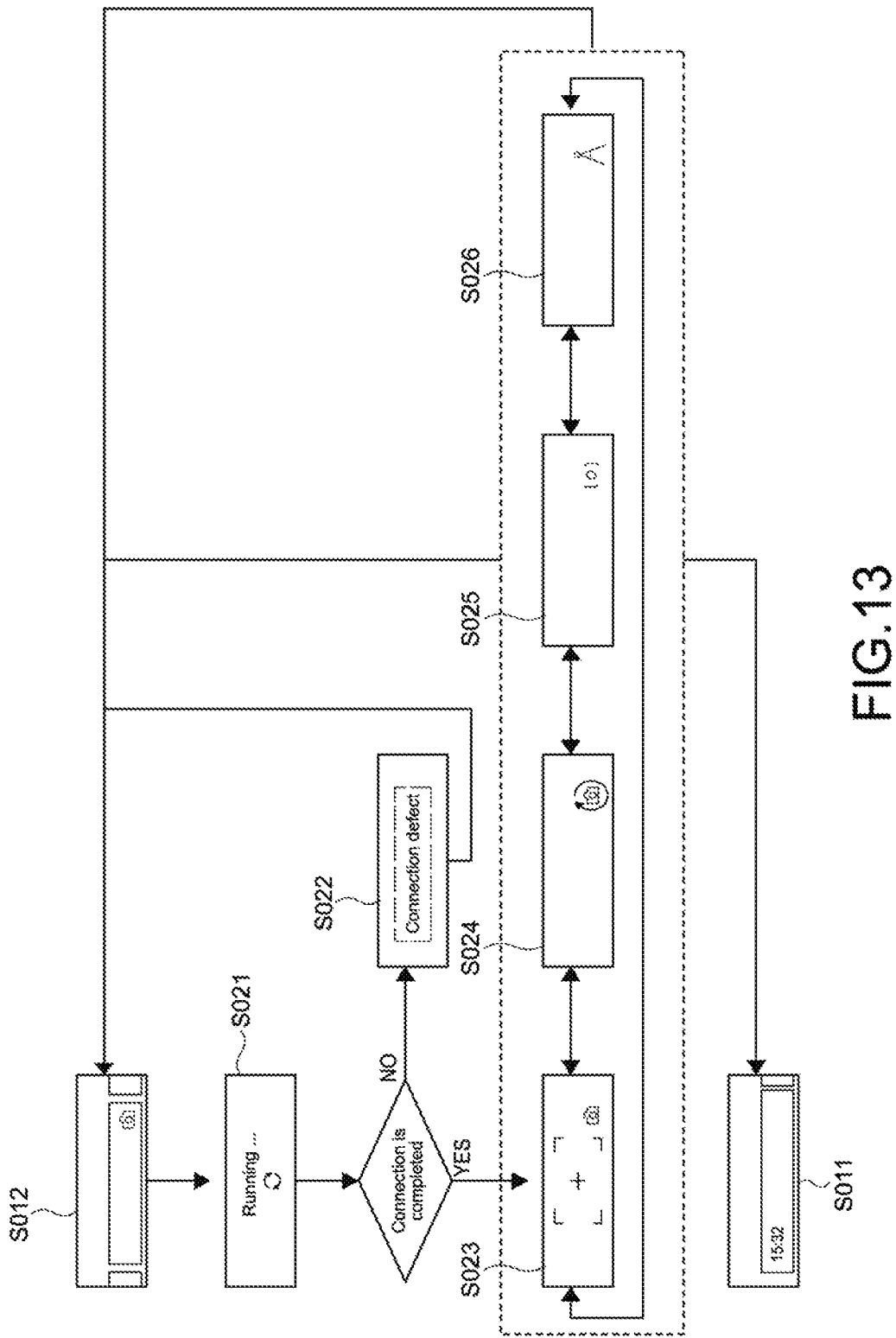
FIG. 13 A diagram showing a transition example of a representative screen to be displayed by the wearable apparatus.

FIG. 13 shows a screen transition example in the layer of the camera screen (S012).

When a tap operation is performed on the camera screen (S012), a start-up screen (S021) is displayed. When the connection of the portable terminal 30 is confirmed, a still image-capturing screen (S023) is first displayed. If the connection is impossible, the screen transitions to a screen (S022) for announcing the connection defect and, after a predetermined time period has elapsed, the screen transitions to the camera screen (S012).

When the still image-capturing screen (S023) is displayed, an interval imaging screen (S024), a moving image-capturing screen (S025), a social live screen (S026) are displayed in the stated order according to forward swipe operations. The screen transitions to the camera screen (S012) due to a press of the back button 504 and transitions to the home screen (S011) due to a long press of the back button 504.

Screen Transition Example 4

Figure 14:
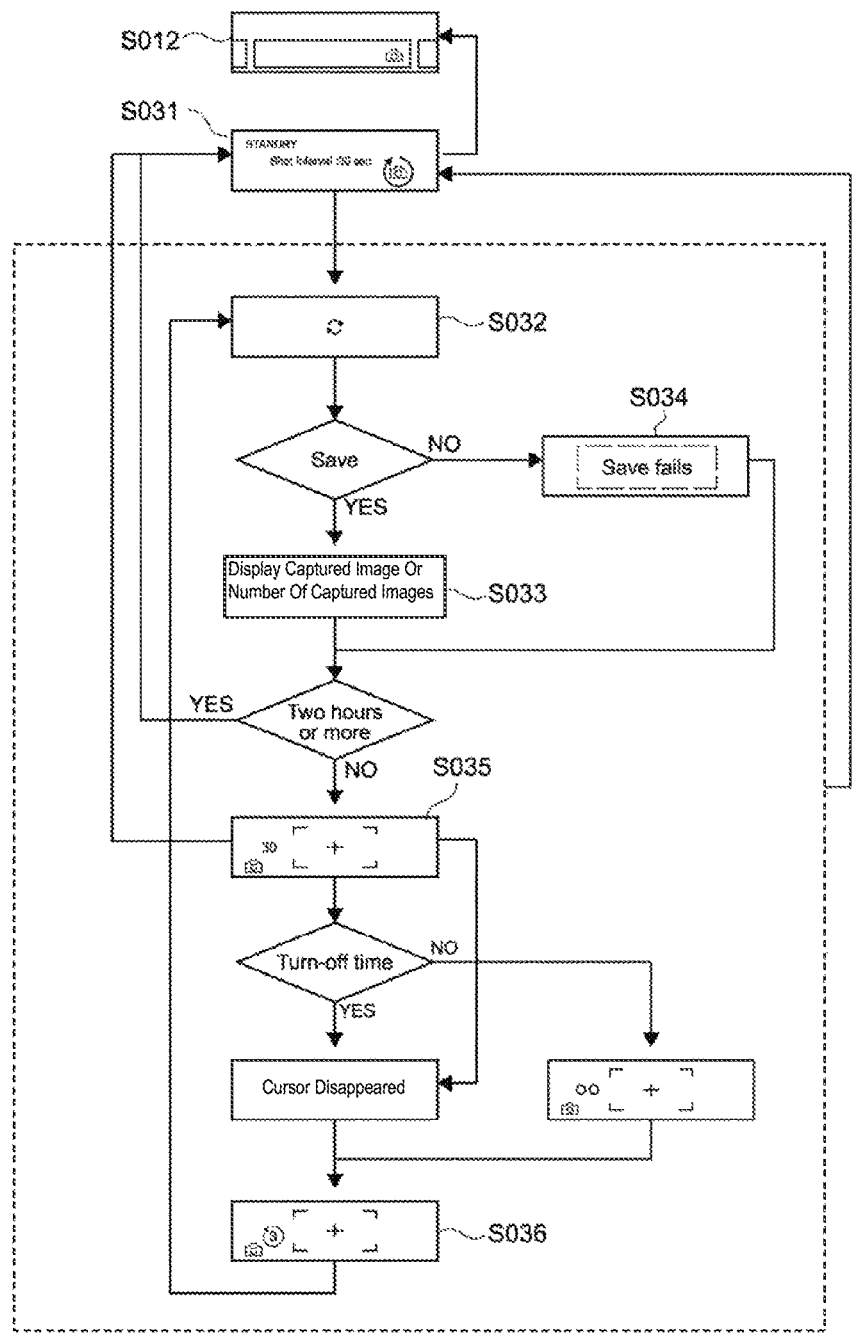
FIG. 14 A diagram showing a transition example of a representative screen to be displayed by the wearable apparatus.

FIG. 14 shows a screen transition example on the interval imaging screen (S024).

When a tap operation is performed on the interval imaging screen (S024), a setting screen (S031) is displayed. Here, an imaging interval is set. It is, for example, 30 seconds by default. Imaging is started by a tap operation and the screen transitions to a save screen (S032) for a captured image. The captured image is saved in the memory of the portable terminal 30. If no operations are performed on the setting screen (S031) for a predetermined time or more, the camera screen (S012) is displayed again.

When the saving of the captured image is completed, the screen transitions to a display screen (S033) for the number of captured images or the captured image. If the saving fails, a screen (S034) for announcing it is displayed.

On the interval imaging mode, a predetermined cursor screen (S035) is displayed on the display unit 71. When a turn-off time for this cursor screen has elapsed, the cursor screen disappears due to user settings. When it becomes three seconds before imaging, the screen transitions to a count down screen (S036) including that cursor image. The captured image is saved in the portable terminal 30 every time it is captured. When the imaging time becomes two hours or more, the screen transitions to the setting screen (S031).

Screen Transition Example 5

Figure 15:
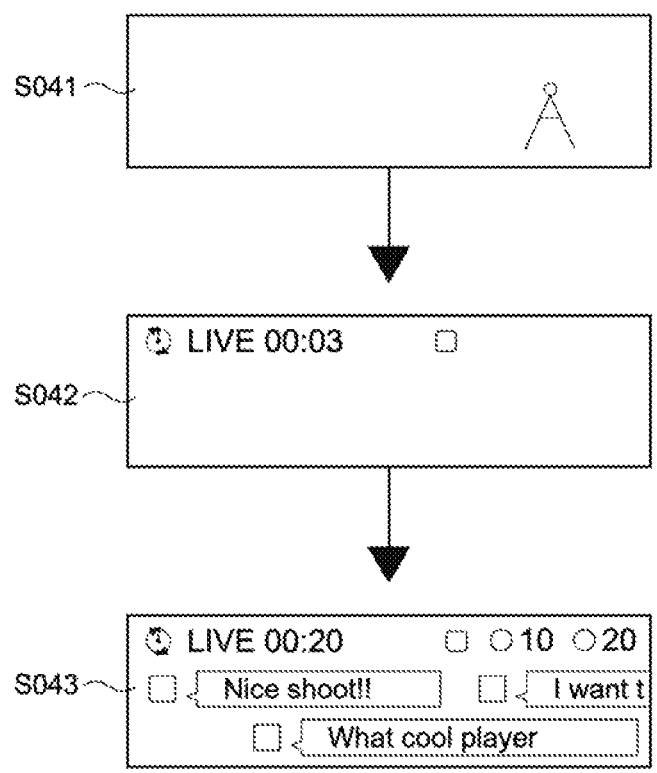
FIG. 15 A diagram showing a transition example of a representative screen to be displayed by the wearable apparatus.

FIG. 15 shows a screen transition example on the social live screen (S025).

When a tap operation is performed on the social live screen (S025), the screen transitions to a stand-by screen (S041). Then, according to a press operation with respect to the camera button 503, the screen transitions to a streaming screen (S042). The captured image is uploaded into the cloud system 10 via the portable terminal 30. At this time, according to an input operation with respect to the talk button 505, a voice is also uploaded to the cloud system 10 together with the image. After a setting time has elapsed, the screen transitions to a reading screen (S043) and comments from viewers are displayed.

Screen Transition Example 6

Figure 16:
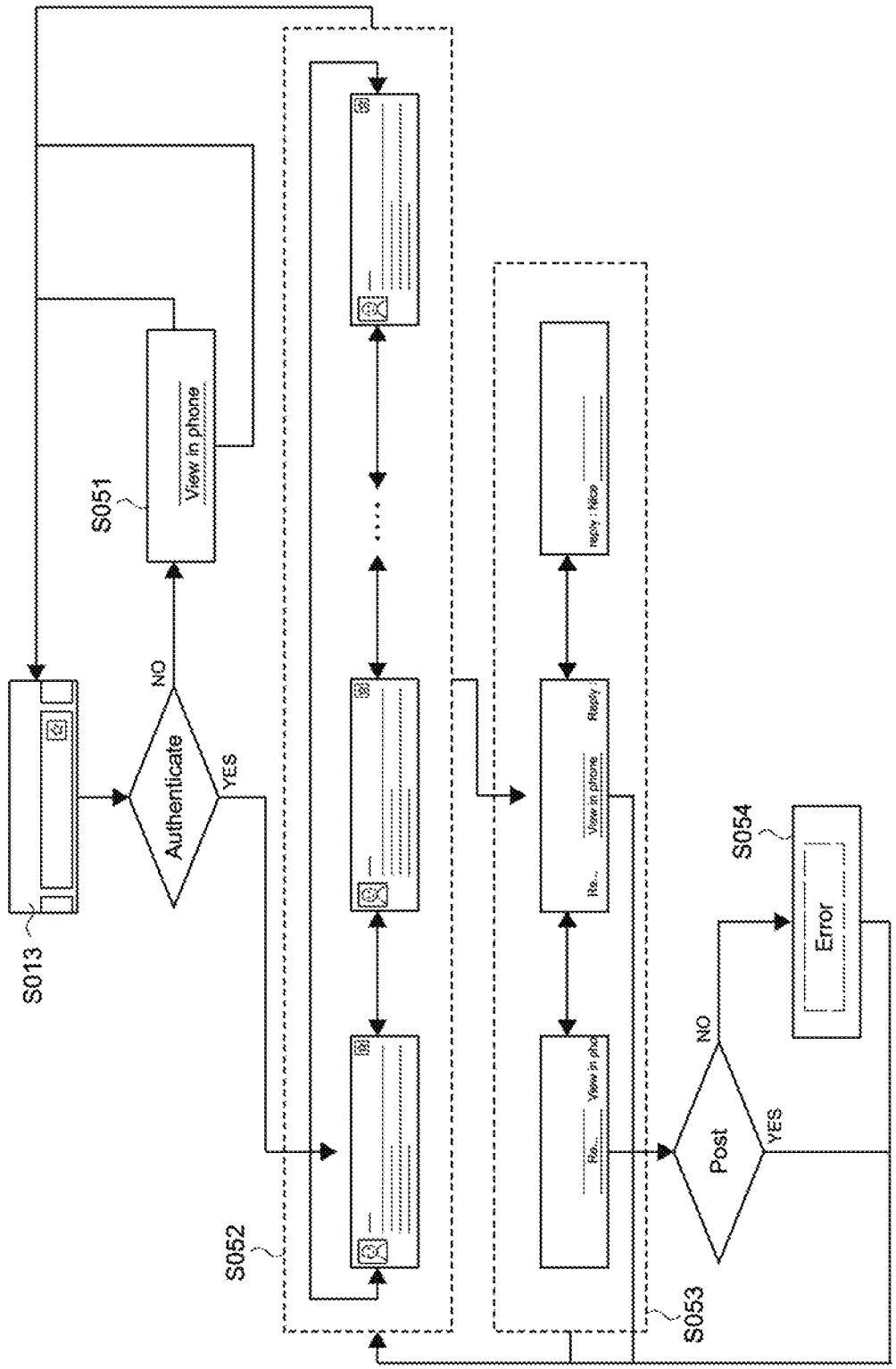
FIG. 16 A diagram showing a transition example of a representative screen to be displayed by the wearable apparatus.

FIG. 16 shows a screen transition example on the SNS screen (S013).

When a tap operation is performed on the SNS screen (S013), the screen transitions to a browsing screen (S052) through authentication. If the authentication is impossible, screen (S051) for prompting authentication is displayed.

When a swipe operation is performed on the browsing screen (S052), the screen transitions in an order of receiving (and vice versa). When a tap operation is performed the single browsing screen, the screen transitions to a reply screen S053 for the comments. In view of this, voice input is made possible by operating the talk button 505, for example. After a message is input, a message is posted by performing the tap operation. If the posting fails, a screen (S054) for announcing it is displayed. After that, the browsing screen (S052) is displayed again.

Screen Transition Example 7

Figure 17:
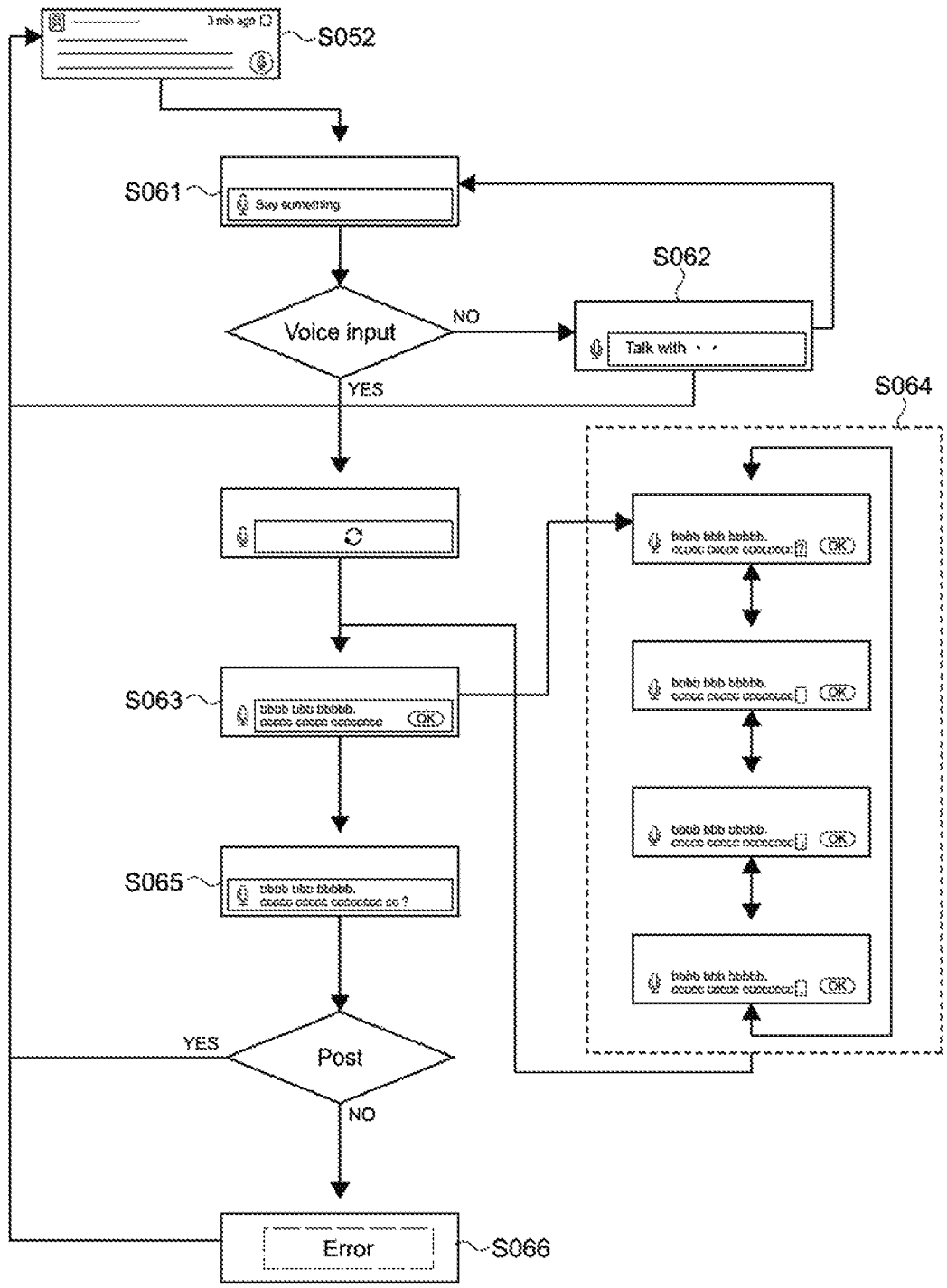
FIG. 17 A diagram showing a transition example of a representative screen to be displayed by the wearable apparatus.

FIG. 17 shows a screen transition example on a voice input screen.

For example, when the talk button 505 is pressed on an arbitrary browsing screen (S052), the screen transitions to a screen (S061) for prompting voice input. The user inputs a message by voice input while pressing the talk button 505. When the talk button 505 is released, if no voice input has been performed, a screen (S062) for announcing an operation method therefor is displayed.

The input voice data is displayed on a text screen (S063). If correction is needed, the screen transitions to an edit screen (S064) according to a swipe operation and a predetermined character is specified according to a swipe operation. When the correction is completed, a tap operation is performed on the text screen (S063) and the screen transitions to a text check screen (S065). After a predetermined time period has elapsed, posting is executed. If the posting fails, a screen (S066) for announcing it is displayed. After that, the original browsing screen (S052) is restored.

Screen Transition Example 8

Figure 18:
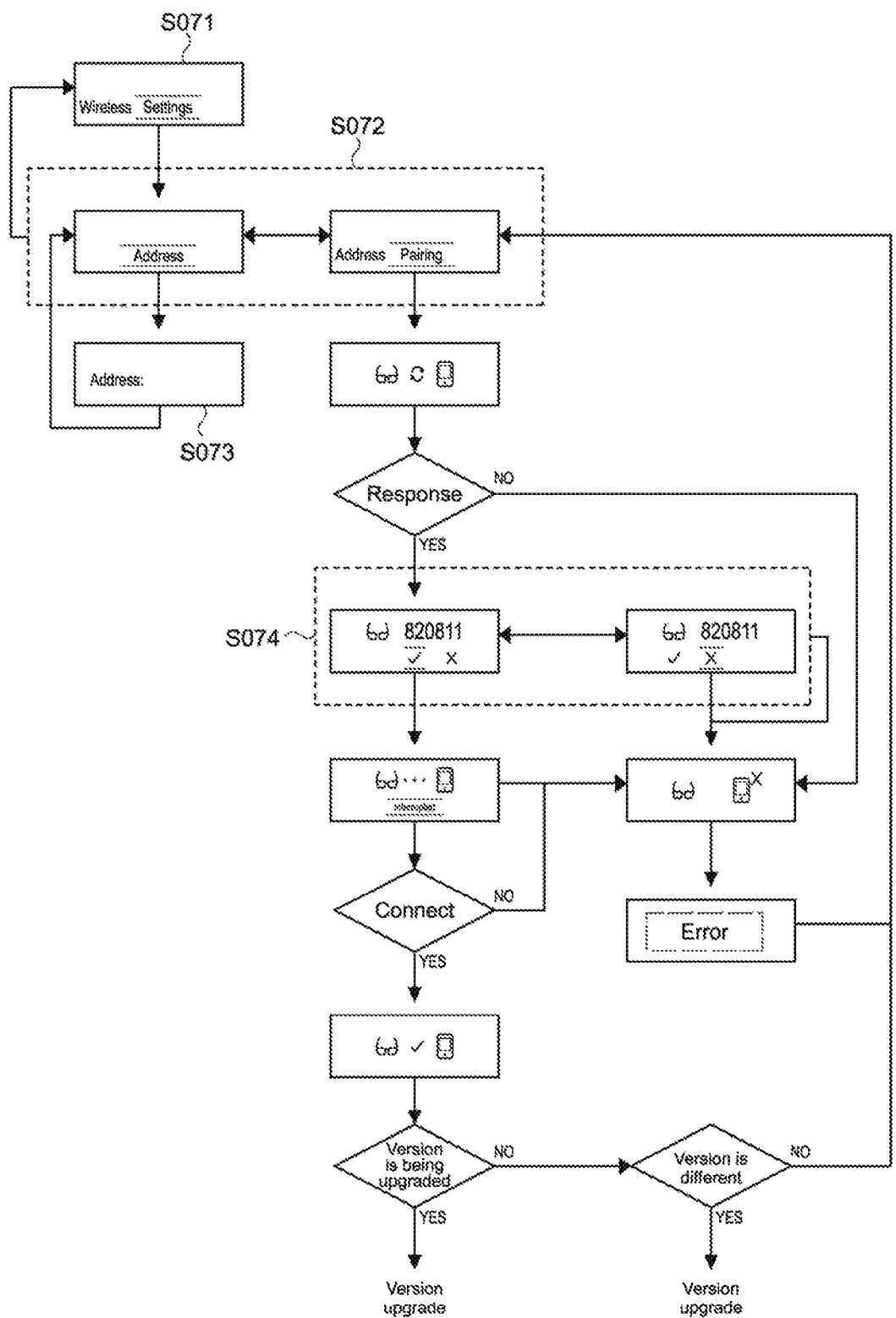
FIG. 18 A diagram showing a transition example of a representative screen to be displayed by the wearable apparatus.

FIG. 18 shows a screen transition example on a setting screen of the local-area communication unit (Bluetooth (registered trademark)).

When a tap operation is performed on the communication setting screen (S014) or the communication is interrupted, the screen transitions to a menu screen (S071). When a tap operation is performed in accordance with the setting mode, the screen transitions to a setting screen (S072). On the setting screen, an address-setting mode or a pairing executing mode is configured to be selectable according to a swipe operation.

When the address-setting mode is selected, an address input screen (S073) of a communication station is displayed. On the other hand, when the pairing the setting mode is selected, the screen transitions to a pairing-executing screen (S074) and the screen transitions to a numerical value comparison authentication screen (S074) if a response is present. After connection, the version the application is upgraded in a predetermined case.

Screen Transition Example 9

Figure 19:
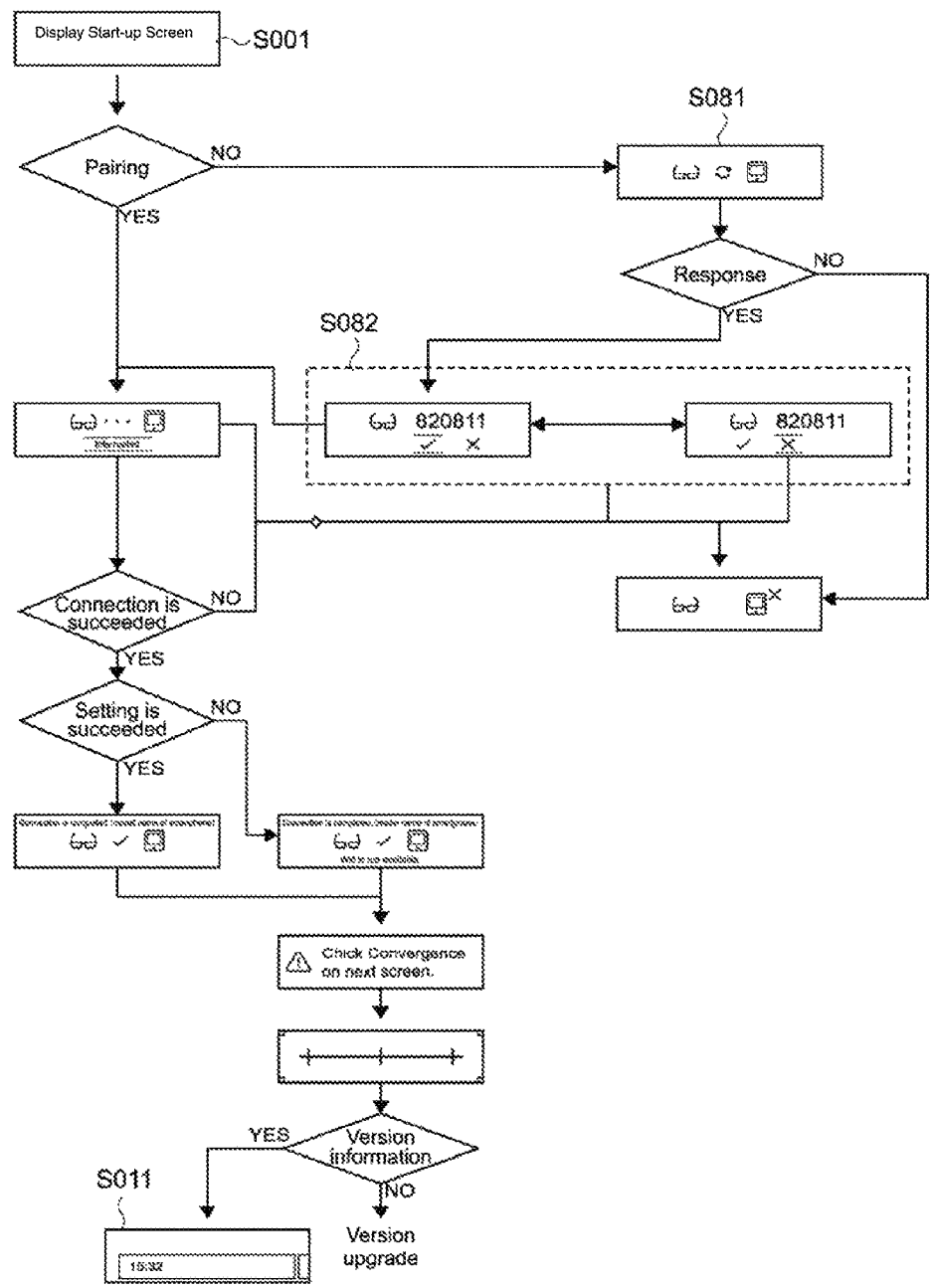
FIG. 19 A diagram showing a transition example of a representative screen to be displayed by the wearable apparatus.

FIG. 19 shows a screen transition example during a one-touch starting operation.

The wearable apparatus 70 is configured to automatically be powered on by NFC communication between the control box 50 and the portable terminal 30 during power-off. On this starting mode, after the start-up screen (S001) is displayed, it automatically transitions to a numerical value comparison authentication screen (S082) if the pairing is not established. The subsequent screen transitions are the same as those of the screen transition example (FIG. 11) for start-up, the description will be omitted.

Screen Transition Example 10

Figure 20:
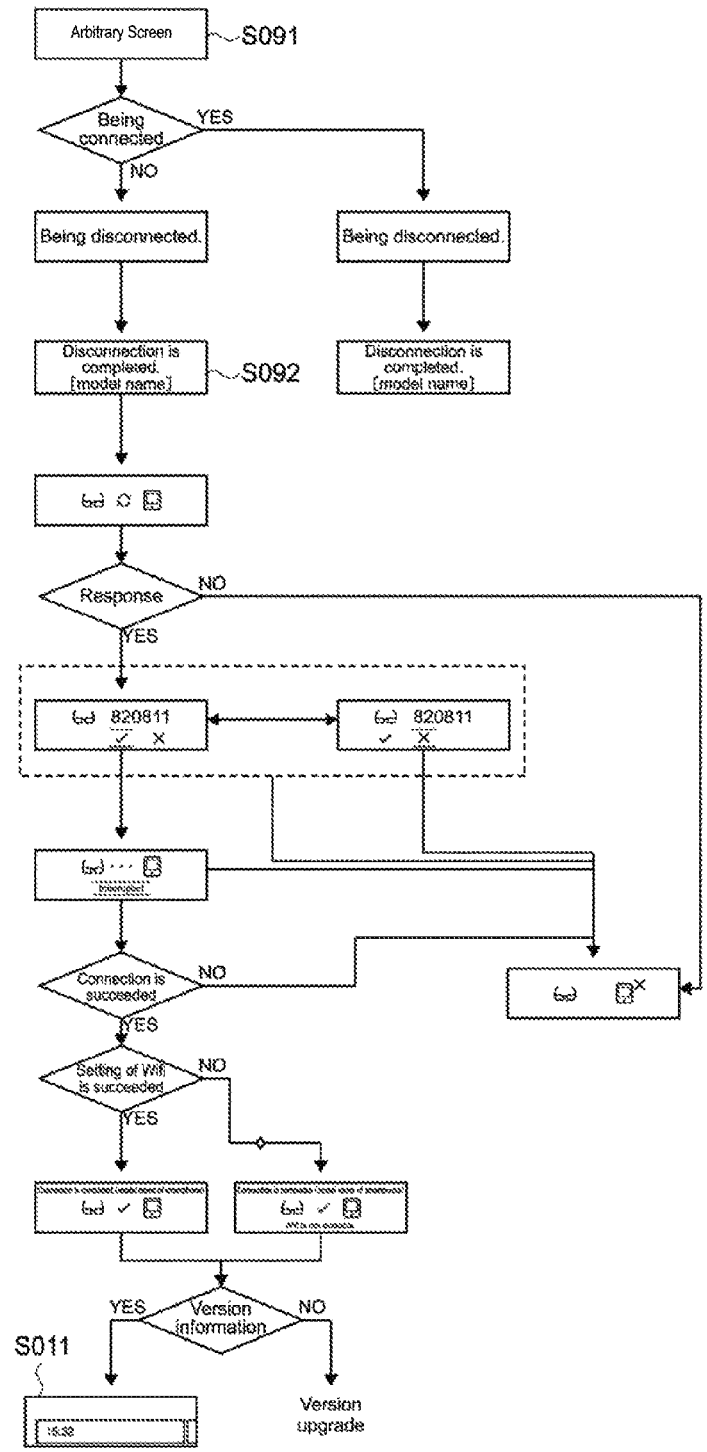
FIG. 20 A diagram showing a transition example of a representative screen to be displayed by the wearable apparatus.

FIG. 20 shows a screen transition example during a one-touch switching operation of the portable terminal 30.

When NFC communication is performed by moving the control box 50 closer to another portable terminal while an arbitrary screen (S091) being displayed, the communication with the currently connected portable terminal 30 is cancelled and the screen transitions to a screen (S092) for announcing it. After that, the pairing with the other portable terminal is automatically executed and the screen transitions to a numerical value comparison authentication screen (S093) if a response is present. The subsequent screen transitions are the same as those of the screen transition example (FIG. 11) in running, and hence the description will be omitted.

Screen Transition Example 11

Figure 21:
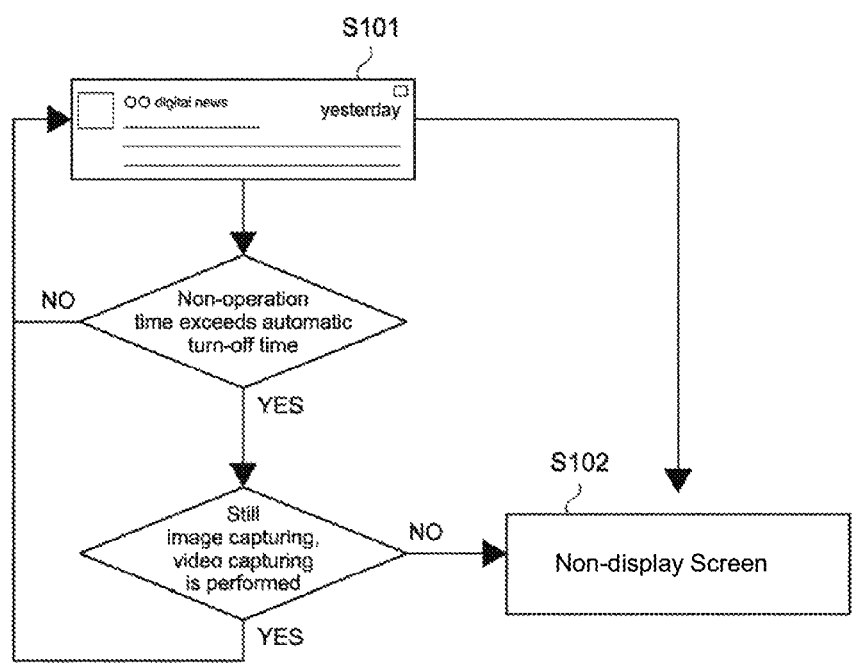
FIG. 21 A diagram showing a transition example of a representative screen to be displayed by the wearable apparatus.

FIG. 21 shows a screen transition example in a display-automatically turning off operation.

If a non-operation time exceeds an automatic turn-off time set in advance and a camera mode (still image capturing, video capturing) is not activated the wearable apparatus 70 automatically transitions from an arbitrary screen (S101) to a non-display screen (S102).

Screen Transition Example 12

Figure 22:
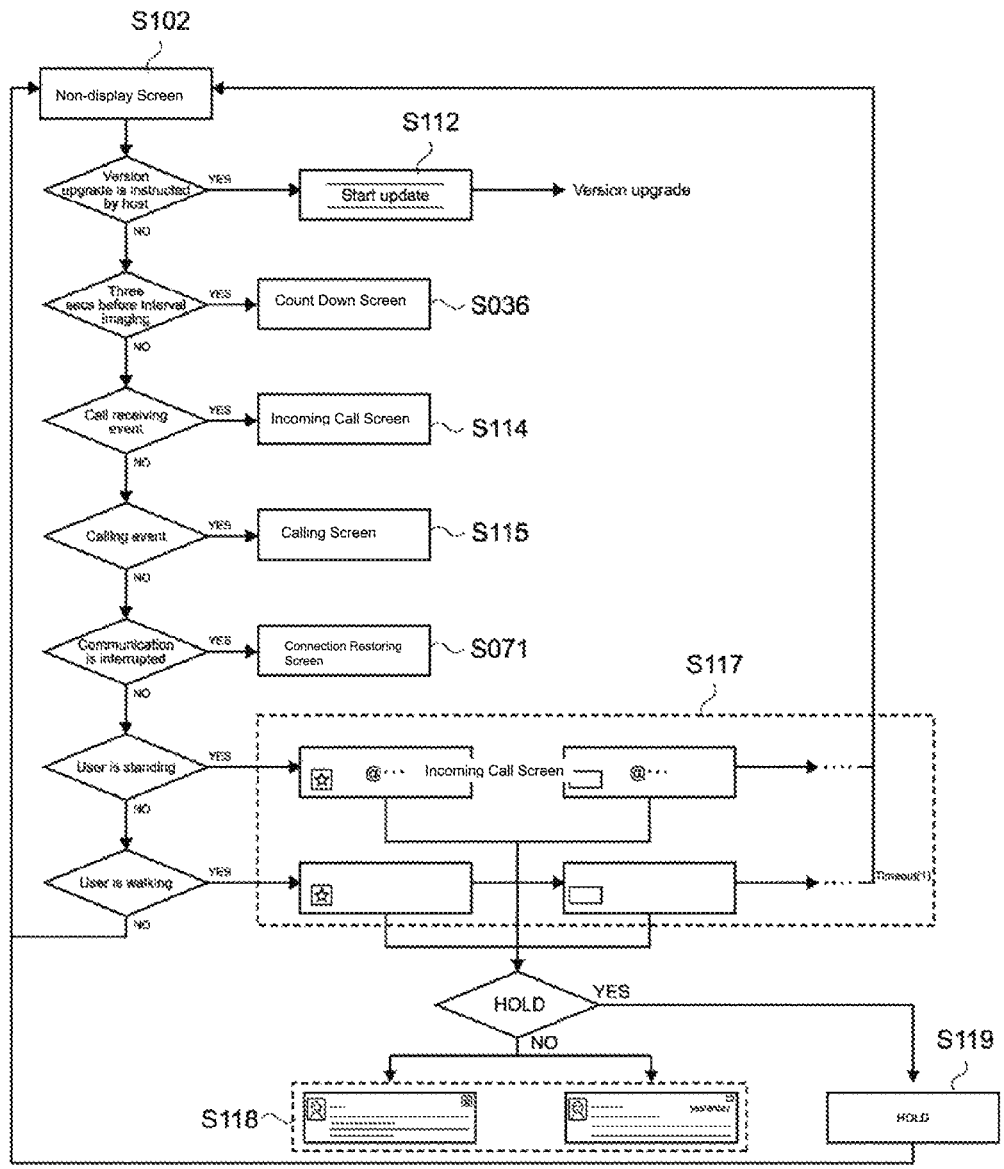
FIG. 22 A diagram showing a transition example of a representative screen to be displayed by the wearable apparatus.

FIG. 22 shows a screen transition example in a display-automatically turning on operation.

If, on a non-display screen (S102), a predetermined event (control signal) is input from the portable terminal 30, a process corresponding to this event is automatically executed. For example, an update starting screen (S112) to be displayed when the version upgrade is instructed by a host, a count-down display screen (S036) on the interval imaging mode, an incoming call screen (S114) when a telephone call is received, a calling screen (S115) during a telephone call, a connection restoring screen (S071) when the communication is cancelled, and the like are automatically displayed.

Further, while the user is standing or walking, the screen transitions to a sender display screen (S117) for various received messages. This screen is configured to transition to the subsequent screens at predetermined time intervals. When a hold operation of the input key 53 is not performed, the screen transitions to a browsing screen S118 showing the contents by performing a tap operation on an arbitrary sender display screen. When the hold operation is performed, a screen (S119) for announcing the fact that the holding is performed is displayed.

The above-mentioned screen transition examples are specific examples of a display control function to jump to a screen of a target layer without the upper-level layer.

Screen Transition Example 13

Figure 23:
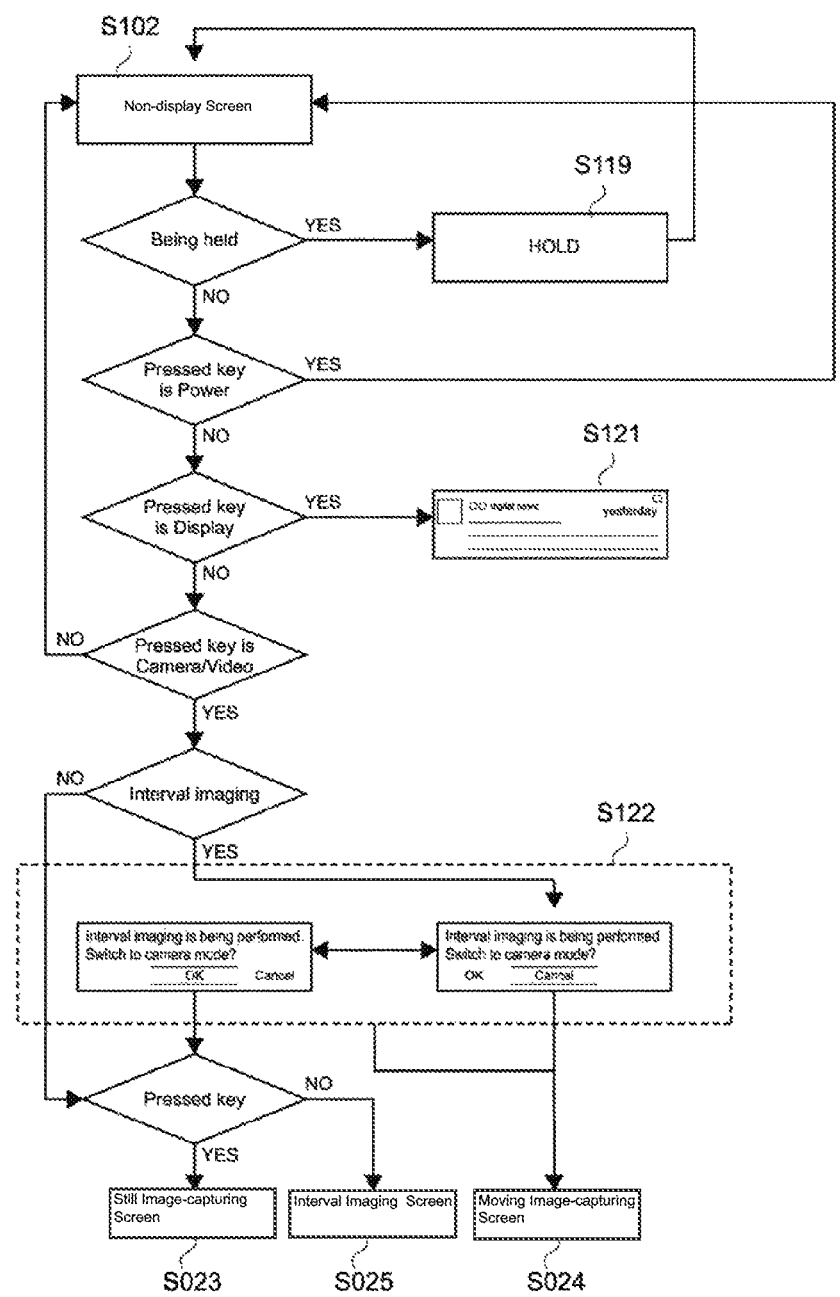
FIG. 23 A diagram showing a transition example of a representative screen to be displayed by the wearable apparatus.

FIG. 23 shows another screen transition example in a display-automatically turning on operation.

When the display button 507 or the camera button 503 is input while a hold operation of the input key is not performed on a non-display screen (S102), a process of transitioning to a corresponding screen is automatically executed.

For example, when the display button 507 is input, the previous screen (S121) which had been displayed before turned off is displayed. Further, when the camera button 503 is input, the screen transitions to a camera mode-switching screen (S122) if the interval imaging is being performed, and the screen transitions to the still image-capturing screen (S023), the interval imaging screen (S024), or the moving image-capturing screen (S025) by user's selection (tap operation).

The above-mentioned screen transition examples are specific examples of the display control function to jump to a screen of a target layer without the upper-level layer.

Screen Transition Example 14

Figure 24:
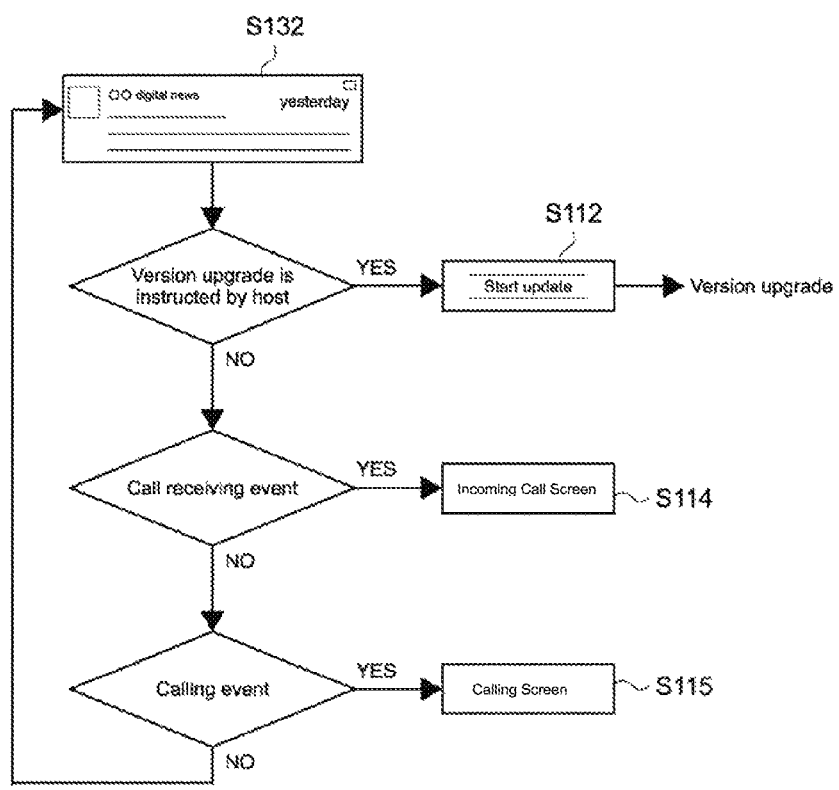
FIG. 24 A diagram showing a transition example of a representative screen to be displayed by the wearable apparatus.

FIG. 24 shows a screen transition example when a notification signal from the portable terminal 30 is received.

If, during display of an arbitrary screen (S132), a version upgrade-instructing event, a call incoming event, or a calling event occurs, the screen transitions to operation screens (S112, S114, S115) corresponding to these events. The above-mentioned screen transition examples are specific examples of the display control function to jump to a screen of a target layer without the upper-level layer.

Screen Transition Example 15

Figure 25:
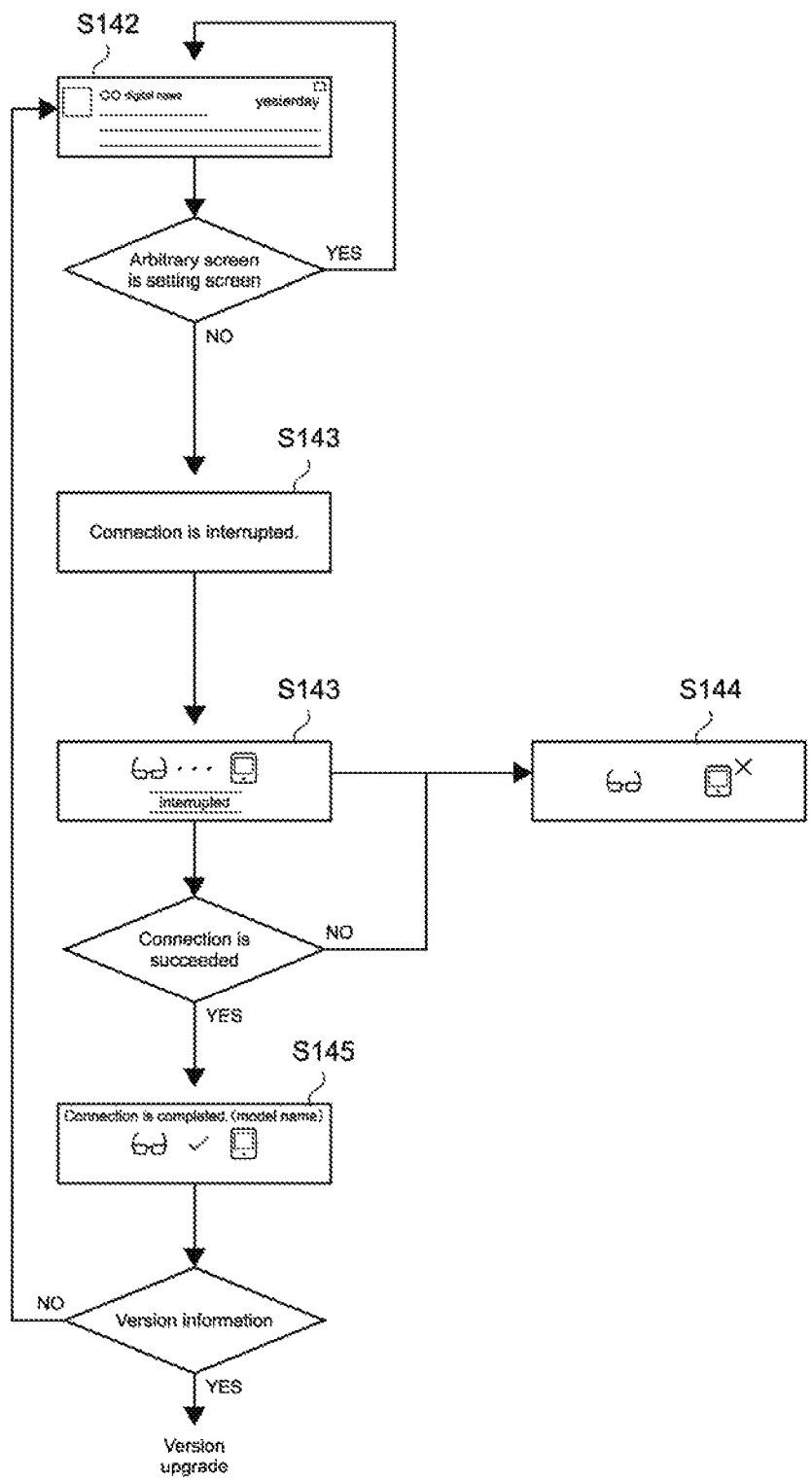
FIG. 25 A diagram showing a transition example of a representative screen to be displayed by the wearable apparatus.

FIG. 25 shows a screen transition example in an operation of restoring the communication connection with the portable terminal 30.

If an arbitrary screen (S142) is a non-setting screen, when the communication connection with the portable terminal 30 is interrupted, the screen transitions to a screen (S143) for announcing it. After a predetermined time period has elapsed, the screen transitions to a reconnection screen (S144). When a connection-interrupting process is executed during re-connection, the connection-interrupting screen (S144) is displayed. If the connection is succeeded, a model display screen (S145) of the connected portable terminal is displayed. After a predetermined time period has elapsed, the original screen (S142) is restored.

This screen transition example is a specific example of the display control function to jump to a screen of a target layer without the upper-level layer.

Screen Transition Example 16

Figure 26:
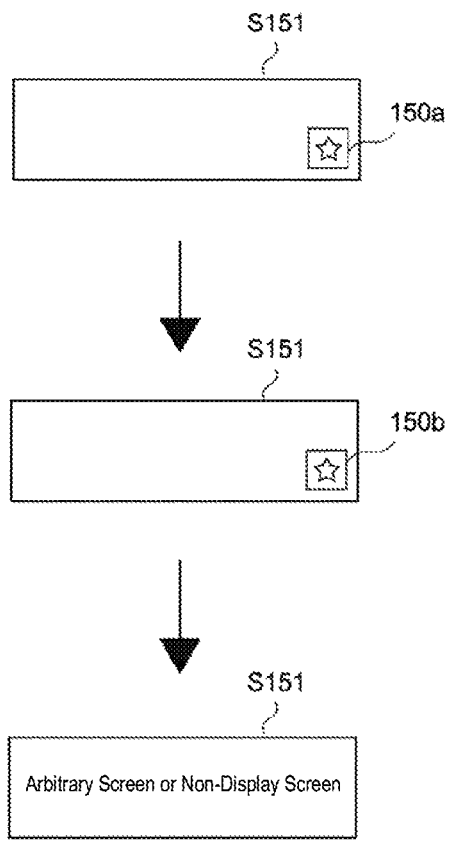
FIG. 26 A diagram showing a transition example of a representative screen to be displayed by the wearable apparatus.

FIG. 26 shows a screen transition example, for example, when a notification signal from the portable terminal 30 is received.

When, on an arbitrary screen or non-display screen (S151), an incoming call notification signal of an electronic mail or the like is received from the portable terminal 30, a notification image 150a blinking at predetermined periods is displayed at a predetermined position of this screen. After that, the image transitions to a notification image 150b continuously lighting for a predetermined time. By inputting the predetermined operation during display of the notification images 150a and 150b, the user can display a mail reception screen (browsing screen).

Screen Transition Example 17

Figure 27:
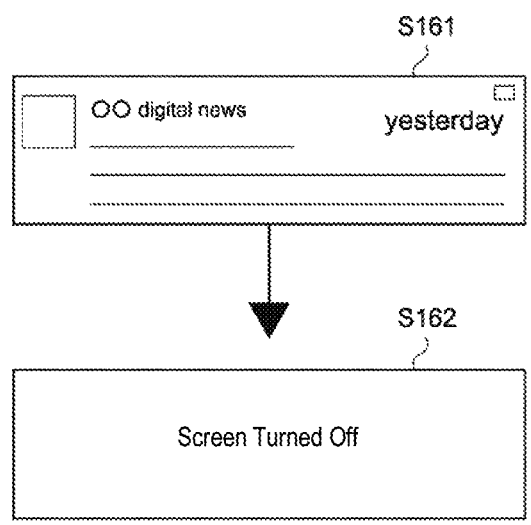
FIG. 27 A diagram showing a transition example of a representative screen to be displayed by the wearable apparatus.

FIG. 27 shows a screen transition example during power-off of the wearable apparatus 70.

By performing an off operation with respect to the power button 506 with an arbitrary screen (S161) being displayed, the screen is turned off (S162). Note that the off operation with respect to the power button 506 is performed on the non-display screen, an arbitrary screen (e.g., the screen that has been displayed before turned off) is displayed for a predetermined time and then, the screen is turned off.

Although the embodiments of the present technology have been described above, it is needless to say that the present technology is not limited only to the above-mentioned embodiments and various modifications can be made without departing from the gist of the present technology.

It should be noted that the present technology may also take the following configurations.

(1) A wearable apparatus, including:
a display unit configured to switch and display a plurality of images classified for each layer;
an operation unit including a first operation section configured to receive input of an operation event that causes the display unit to display, from a first image belonging to a first layer, a second image relating to the first image and belonging to a second layer at a level lower than the first image;
a reception unit configured to be capable of receiving a control signal for prompting access to the second image; and
a display control unit configured to selectively execute
a first display control mode that causes the display unit to display, on the basis of the operation event, the second image from a third image not relating to the first image via the first image, and
a second display control mode that enables the display unit to display the second image from the third image without the first image when the control signal is received.

(2) The wearable apparatus according to (1), in which
the operation unit further includes a second operation section that generates the control signal according to an input operation, and
the display control unit is configured to cause the display unit to display an image belonging to the predetermined layer when the input operation on the second operation section is performed.

(3) The wearable apparatus according to (2), further including
an imaging unit operable by the second operation section, in which
the display control unit is configured to cause the display unit to display an operation screen of the imaging unit on the basis of the input operation on the second operation section.

(4) The wearable apparatus according to any one of (1) to (3), in which
the reception unit is configured to be capable of receiving the control signal from an external apparatus, and
the display control unit is configured to cause the display unit to display a predetermined notification image when the control signal is received.

(5) The wearable apparatus according to (4), in which
the display control unit is configured to cause the display unit to display a screen relating to the notification image when the input of the predetermined operation event is received with the predetermined notification image being displayed.

(6) A control apparatus for controlling a wearable apparatus including a display unit configured to switch and display a plurality of images classified for each layer, including:
an operation unit including a first operation section configured to receive input of an operation event that causes the display unit to display, from a first image belonging to a first layer, a second image relating to the first image and belonging to a second layer at a level lower than the first image;
a reception unit configured to be capable of receiving a control signal for prompting access to the second image; and
a display control unit configured to selectively execute a first display control mode that enables the display unit to display, on the basis of the operation event, the second image from a third image not relating to the first image via the first image, and
a second display control mode that enables the display unit to display the second image from the third image without the first image when the control signal is received.

(7) The control apparatus according to (6), in which
the operation unit further includes a second operation section that generates the control signal according to an input operation, and
the display control unit is configured to cause the display unit to display an image belonging to the predetermined layer when the input operation on the second operation section is performed.

(8) The control apparatus according to (6) or (7), in which
the operation unit further includes a casing including a cutout in a part of a side peripheral surface,
the first operation section is constituted of a capacitive sensor disposed in the cutout, and
the second operation section includes a plurality of input keys arranged in the side peripheral surface of the casing.

(9) The control apparatus according to (8), in which
the plurality of input keys include an input button for operating an imaging unit mounted on the wearable apparatus.

DESCRIPTION OF REFERENCE NUMERALS 30 portable terminal
45 firmware
50 control box
55 touch panel
52 memory
70 wearable apparatus
71 display unit
100 information processing system
200 card layer
210 card screen
300 app layer
310 app screen

The invention claimed is:
1. A wearable apparatus, comprising:
a display screen; and
a control device that comprises:
a casing that includes a cutout in a side peripheral surface of the casing;
a touch panel configured to output a first plurality of input operation signals, wherein
the touch panel comprises a capacitive sensor, and
the touch panel is in the cutout of the casing; and
circuitry configured to:
turn on a power of the wearable apparatus based on a near field communication (NFC) between the control device and an external apparatus;
execute a pairing process between the external apparatus and the wearable apparatus after the turn on of the power of the wearable apparatus:
control, based on the executed pairing process, the display screen to display a connection-succeeded screen;
control the display screen to display a plurality of images that corresponds to a plurality of layers;
store a fixed number of first images of the plurality of images,
wherein the fixed number of first images correspond to a first layer of the plurality of layers;

receive a first input operation signal, of the first plurality of input operation signals, corresponding to the fixed number of first images;
receive a second image from the external apparatus based on the received first input operation signal, wherein the received second image corresponds to one of the fixed number of first images;
control the display screen to display the received second image in a specific region of the one of the fixed number of first images;
maintain the fixed number of first images based on the received second image;
receive a second input operation signal of the first plurality of input operation signals, wherein
the second input operation signal corresponds to a third image of the plurality of images,
the third image corresponds to a second layer of the plurality of layers, and
the third image is associated with a fourth image of the fixed number of first images; and
control the display screen to switch from a display of a fifth image of the plurality of images to a display of the third image, wherein
the switch is based on the reception of the second input operation signal for a threshold time period after the reception of the first input operation signal,
the fifth image corresponds to a specific layer of the plurality of layers different from the second layer,
the specific layer of the plurality of layers is at one of a lower level or a higher level than the second layer, and
the second layer is at a lower level than the first layer.

2. The wearable apparatus according to claim 1, wherein the circuitry is further configured to:
receive a second plurality of input operation signals; and
control the display screen to display at least one image of the plurality of images, wherein
the at least one image corresponds to at least one layer of the plurality of layers, and
the at least one image is displayed based on a third input operation signal of the second plurality of input operation signals.

3. The wearable apparatus according to claim 2, further comprising an imaging device, wherein
the circuitry is further configured to control the display screen to display an operation screen of the imaging device, and
the operation screen is displayed based on a fourth input operation signal of the second plurality of input operation signals.

4. The wearable apparatus according to claim 1, wherein the circuitry is further configured to:
receive a third input operation signal of the first plurality of input operation signals, wherein the third input operation signal corresponds to a notification image; and
control, based on the received third input operation signal, the display screen to display a screen associated with the notification image.

5. The wearable apparatus according to claim 1, wherein the circuitry is further configured to:
receive a third input operation signal of the first plurality of input operation signals,
wherein the third input operation signal corresponds to the third image; and
control the display screen to switch from the display of the fifth image to the display of the third image via the fourth image,
wherein the switch is based on the received third input operation signal.

6. The wearable apparatus according to claim 1, wherein the circuitry is further configured to discard at least one first image of the fixed number of first images based on the received first input operation signal.

7. The wearable apparatus according to claim 1, wherein the circuitry is further configured to:
receive an audio input;
convert the received audio input into a text; and
display the text.

8. The wearable apparatus according to claim 1, wherein the circuitry is further configured to:
receive a control signal from the external apparatus; and
control, based on the received control signal, the display screen to display a notification image at a specific position on the third image.

9. A control apparatus, comprising:
a casing that includes a cutout in a side peripheral surface of the casing;
a touch panel configured to output a first plurality of input operation signals, wherein
the touch panel comprises a capacitive sensor, and
the touch panel is in the cutout of the casing; and
circuitry configured to:
turn on a power of a wearable apparatus based on a near field communication (NFC) between the control apparatus and an external apparatus;
execute a pairing process between the external apparatus and the wearable apparatus after the turn on of the power of the wearable apparatus;
control, based on the executed pairing process, a display screen of the wearable apparatus to display a connection-succeeded screen;
control the display screen to display a plurality of images that corresponds to a plurality of layers;
store a fixed number of first images of the plurality of images,
wherein the fixed number of first images correspond to a first layer of the plurality of layers;
receive a first input operation signal, of the first plurality of input operation signals, corresponding to the fixed number of first images;
receive a second image from the external apparatus based on the received first input operation signal,
wherein the received second image corresponds to one of the fixed number of first images;
control the display screen to display the received second image in a specific region of the one of the fixed number of first images;
maintain the fixed number of first images based on the received second image;
receive a second input operation signal of the first plurality of input operation signals, wherein
the second input operation signal corresponds to a third image of the plurality of images,
the third image corresponds to a second layer of the plurality of layers, and
the third image is associated with a fourth image of the fixed number of first images; and control the display screen to switch form a display of a fifth image of the plurality of images to a display of the third image, wherein
the switch is based on the reception of the second input operation signal for a threshold time period after the reception of the first input operation signal,
the fifth image corresponds to a specific layer of the plurality of layers different form the second layer,
the specific layer of the plurality of layers is at one of a lower level or a higher level than the second layer, and
the second layer is at a lower level than the first layer.

10. The control apparatus according to claim 9, wherein the circuitry is further configured to:
receive a second plurality of input operation signals; and
control the display screen to display at least one image of the plurality of images, wherein
the at least one image corresponds to at least one layer of the plurality of layers, and
the at least one image is displayed based on a third input operation signal of the second plurality of input operation signals.

11. The control apparatus according to claim 9, further comprising:
a plurality of input keys configured to receive a second plurality of input operation signals, wherein the plurality of input keys is in the side peripheral surface of the casing.

12. The control apparatus according to claim 11, wherein the plurality of input keys includes at least one input key configured to operate an imaging device, and
the imaging device is mounted on the wearable apparatus.

* * * * *